United States Patent [19]
Koda et al.

[11] Patent Number: 5,530,949
[45] Date of Patent: Jun. 25, 1996

[54] TRANSMISSION EQUIPMENT

[75] Inventors: Eiji Koda; Miwa Ogura, both of Kawasaki, Japan

[73] Assignee: Fujitsu Limited, Kanagawa, Japan

[21] Appl. No.: 319,472

[22] Filed: Oct. 6, 1994

Related U.S. Application Data

[63] Continuation of Ser. No. 855,769, Mar. 18, 1992, now abandoned.

[30] Foreign Application Priority Data

Mar. 19, 1991 [JP] Japan .................................. 3-080968
Mar. 20, 1991 [JP] Japan .................................. 3-082015

[51] Int. Cl.$^6$ .............................. G06F 11/34; G06F 1/00
[52] U.S. Cl. .............................. 395/182.08; 395/183.07; 364/268.3; 364/228.4
[58] Field of Search ........................ 371/10.1, 9.1, 371/8.1; 364/268, 268.3, 228.3, 228.4, 228.5, 228.6, 269.2; 395/575, 180, 183.01, 183.07, 183.13, 185.01, 185.02, 650, 600, 182.08

[56] References Cited

U.S. PATENT DOCUMENTS

| | | | |
|---|---|---|---|
| 4,511,982 | 4/1985 | Kurakake | 371/9.1 |
| 4,751,702 | 6/1988 | Beier et al. | 371/9.1 |
| 4,775,976 | 10/1988 | Yokoyama | 371/9.1 |
| 4,823,256 | 4/1989 | Bishop et al. | 364/200 |
| 4,864,557 | 9/1989 | Morton et al. | 371/10.1 |
| 4,894,828 | 1/1990 | Novy et al. | 371/9.1 |
| 5,121,486 | 6/1992 | Kurihara et al. | 371/9.1 |
| 5,193,176 | 3/1993 | Brandin | 395/575 |
| 5,276,860 | 1/1994 | Fortier et al. | 395/575 |

*Primary Examiner*—Robert W. Beausoliel, Jr.
*Assistant Examiner*—T. Tu

[57] ABSTRACT

A transmission equipment comprising a center management device collecting data from units connected to subscriber terminals. The center management device includes two processing units and a control unit for controlling operational states of the first and second processing unit in such a way that when one of the two processing units is working, the other of the two processing units is in a standby state. The two processing units process the same data by using a data backup unit whereby all of the units can be made by hardware which may be easily replaced or added. Alternatively, each unit may have a program downloading unit so that if a new function is added or new unit is added, the program in the unit may be down loaded to the center management device.

17 Claims, 19 Drawing Sheets

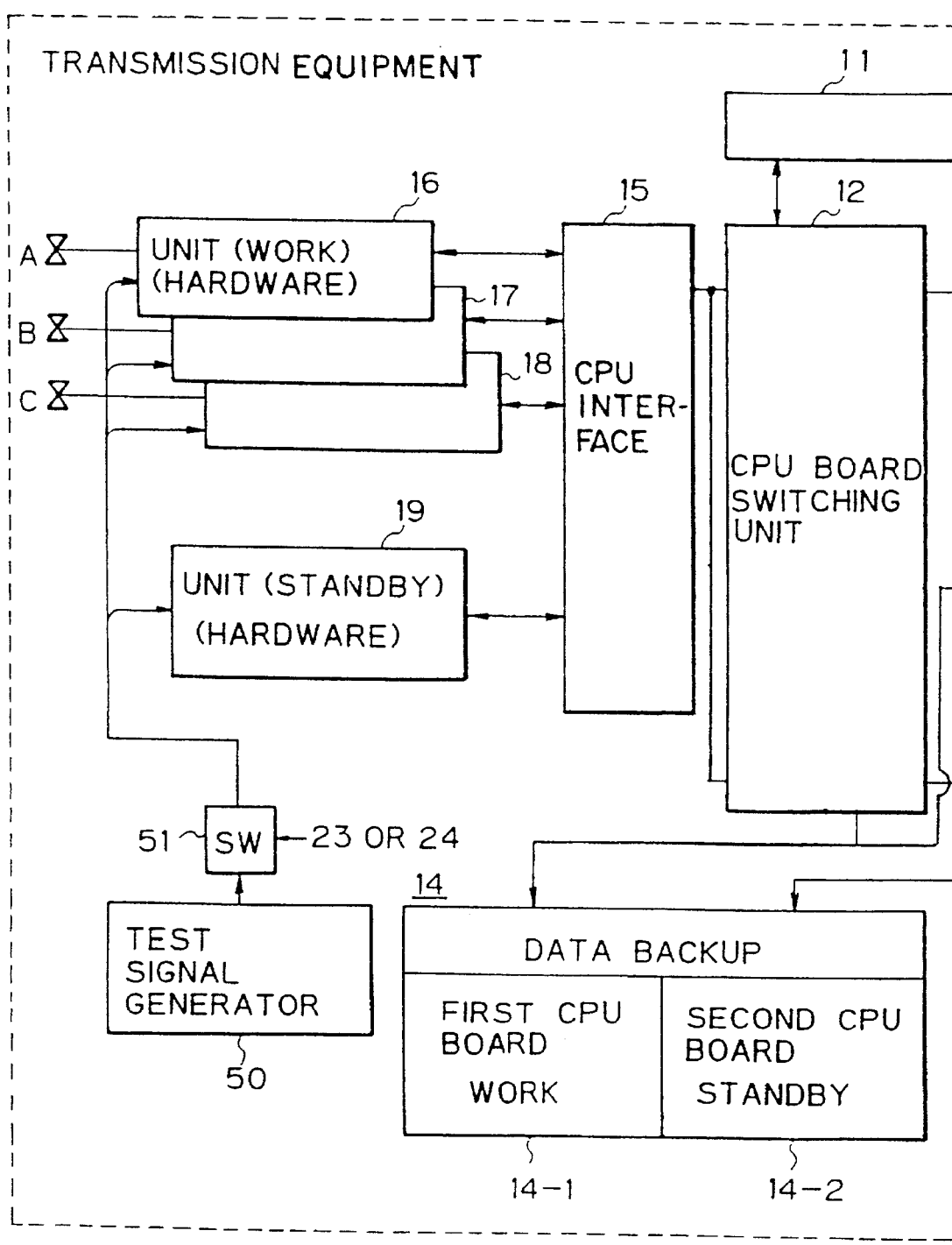

TRANSMISSION EQUIPMENT

This is a continuation of application Ser. No. 07/855,769, filed Mar. 18, 1992, now abandoned.

BACKGROUND OF THE INVENTION

(1) Field of the Invention

The present invention relates to a transmission equipment, and more particularly to a basic architecture of a transmission equipment for effectively realizing data back-up, program down-loading, diagnosis of respective functions, The transmission equipment relating to the present invention is located close to subscriber terminals or to an exchange, for converting analog signals to digital signals or vise versa. The present invention also relates to a memory updating system for a integrated state management device (or, in other words, a center management device) in the transmission equipment, which allows maintenance operation, such as version up operation for a unit without requiring modification of the integrated state management device.

(2) Description of the Related Art

In recent years, telecommunication technologies have progressed very quickly for providing more and more options for subscribers. Such progress in technologies of communication naturally requires more functions or performances for transmission system. Namely, according to the increase of functions or performance of the transmission equipment in recent years, there is a tendency to replace the construction solely formed by hardware in the prior art with CPU. Therefore, reliance for the software which controls CPU is increased. As a result, the influences of bug in the software, version up of the software by adding a new function, destruction of data necessary for running the software, etc., on service to customers is increased. Therefore, a countermeasure to suppress the influences has been required. This requires that the transmission equipment has functions of data back-up, program down-loading, self-diagnosis.

In the meanwhile, it is the typical conventional custom that, in order to realize higher performance, each unit in the transmission equipment includes a CPU (central processing unit) and a program, and data is managed independently by the unit.

In such conventional system, various drawbacks are encountered. For example, even when data back-up is performed in the same unit, if the unit goes breakdown and is necessary to be replaced, the back-up data are also lost so that back-up becomes meaningless. Therefore, for back-up, separate unit has to be provided. Namely, when data back-up, program down-loading, self-diagnosis is to be realized in such architecture, it becomes necessary to establish dual system for each unit. This clearly cause a higher cost for the facilities and requires a larger size of the system. Furthermore, it may results in degradation of installation efficiency of the transmission equipment and create a problem that the above-mentioned function, such as data back-up, cannot be practically realized.

On the other hand, in the modern telephone network system, it is a trend to have a integrated state management device for integrally managing data in the units in the transmission equipment, for higher efficiency of maintenance operation. In such integrated state management device, according to progress of the technologies in the transmission equipments and to increasing of data amount for state management, higher speed of data processing and effective use of memories have been strongly required.

In such integrated state management device, when the version up of the transmission equipment is effected by adding a memory board, it becomes essential to make the state information in the memory of the integrated state management device and the state information in the memory of the memory board are consistent with each other. Therefore, checking operation for check SUM becomes necessary.

In this case, if the interface between the integrated state management device and the memory board allows only read/write functions, the unit will perform reading operation to read out the memory content of the integrated state management device and to perform check of the check SUM therein. Typically, processing in the unit is performed to sequentially read out predetermined size Of memory contents in the memory of the integrated state management device. As set forth above, since it is essential that the memory contents in the unit and that in the integrated state management device must be consistent from each other, such process of reading data segments and performing checking of check SUM has to be performed regularly or continuously. For plurality units, the integrated state management device sequentially issues sequence master right for respective unit in order by polling. Therefore, number of sequences corresponding to the number of the units in the transmission equipment becomes necessary. When number of units is increased for version up, the sequences between the integrated state management device and units are naturally increased. This clearly causes delay of the process time. In addition, in case that the memory capacities in respective units are not sufficient, number of sequences should be further increased to cause further delay in the process.

On the other hand, when the interface between the integrated state management device and the units allows functions other than read/write function, an addition of check SUM calculation process request command (CMD) is required to the integrated state management device from the unit, associated with increasing or modification of the functions. Also, when other function is required, the addition of the corresponding command becomes necessary. In such case, the integrated state management device is required to be provided the decoding means for the new commands as well as programs necessary for performing the new commands. This causes necessity of modification of the integrated state management device.

SUMMARY OF THE INVENTION

Therefore, it is an object of the present invention to provide a basic architecture of the transmission equipment which can realize functions of data back-up, program down-loading, self-diagnosis under limited installation condition of the transmission equipment.

Another object of the invention is to provide a memory updating system which does not require modification of a integrated state management device when a unit is added associated with addition of functions, and which can eliminate increasing of number of sequences between the integrated state management device and units even when the memory capacities of the memories in the units are insufficient.

In order to accomplish the above-mentioned first object, a transmission equipment, according to one aspect of the invention, comprises: a plurality of units for performing respectively predetermined functions; a center management device collecting data from the units, the center management device including: a first processing unit for performing predetermined processing operations including at least one specific operation which requires interruption of services; a second processing unit for performing predetermined processing operations including at least one specific operation which requires interruption of services; and a third unit for controlling operational states of the first and second processing units between a first state active for services and a second state inactive for services, the third unit being responsive to initiation of the specific operation acting in the first state to switch status thereof into the second state and switch the other of the first and second processing unit into the first state for services.

In a practical embodiment, the specific operation may be at least one of data back-up operation, program loading operation, and diagnosis operation.

In the preferred construction, the transmission equipment may further comprise a nonvolatile memory as aback-up data storage medium. In this case, the specific operation is data back-up for the units for writing data in respective unit to the nonvolatile memory through one of the first and second processing unit in the second state.

For preferred operation, the first and second processing unit normally operates in unison with each other irrespective of operational status so as to allow instant change over of states for maintaining services.

In order to accomplish the second object of the invention, a transmission equipment, according to the present invention, comprises: a CPU processing unit for collecting data from a plurality of units and integratingly processing the same; the CPU processing unit including: a first CPU board; a second CPU board active as a standby board or a working board relative to the first CPU board; a controller; a program loader; a CPU board switching unit for switching the first CPU board and the second CPU board between working and standby; and data back-up unit constituted of a non-volatile memory for backing up data in the first and second CPU boards.

Preferably, the first CPU board and the second CPU board are respectively provided with working and standby CPUs.

According to a further aspect of the invention, a transmission equipment comprises: a plurality of units performing respectively predetermined functions: a center management device monitoring states of respective of the units, the center management device including a memory for storing data representative of the status of respective units; a down-loading unit, incorporated in each of the unit, for down-loading a data updating program to be executed for updating the data representative of the status of the unit.

The center management device may include a program memory for storing the down-loaded data updating program. The center management device assigns a right for updating for one of the units which has data to be updated for receiving the data updating program and data to be updated for performing updating operation for the memory storing the data representative of the status of the corresponding unit.

In the preferred construction, the center management device includes a first processing unit for performing predetermined processing operations including program down-loading operation which requires interruption of services; a second processing unit for performing predetermined processing operations including program down-loading operation which requires interruption of services; and a third unit for controlling operational states of the first and second processing unit between a first state active for services and a second state inactive for services, the third unit being responsive to initiation of the program down-loading operation acting in the first state to switch status thereof into the second state and switch the other of the first and second processing unit into the first state for services.

Practically, the center management device may comprise: a first CPU board; a second CPU board active as a standby board or a working board relative to the first CPU board; a controller; a program loader; a CPU board switching unit for switching the first CPU board and the second CPU board between working and reserving; and a data back-up unit constituted of a non-volatile memory for backing up data in the first and the second CPU boards.

According to a still further aspect of the invention, a memory updating system for a center management device in a transmission equipment comprises: a plurality of different functions and different types of units; a memory incorporated in the center management device for storing a plurality of different types of data representative of the status of the units; a program holding unit provided in each of the unit for storing updating program for performing updating operation for data representative of the status of the corresponding unit; a down-loading unit provided in each of the unit for down-loading the updating program from the unit to the center management device; and an execution unit provided in the center management device for executing the updating program for updating the content of the memory with a data representative of the status of the unit from which the updating program is down-loaded.

According to a yet further aspect of the invention, a transmission equipment comprises: a plurality of different functions and different types of units; a memory incorporated in the center management device for storing a plurality of different types of data representative of the status of the units; a program holding unit provided in each of the unit for storing program for performing function corresponding to a command provided in the corresponding unit; a down-loading unit provided in each of the unit for down-loading the program from the unit to the center management device; and an execution unit provided in the center management device for executing the program for performing the corresponding command function.

BRIEF DESCRIPTION OF THE DRAWINGS

The present invention will be more fully understood from the detailed description given herebelow and from the accompanying drawings of the preferred embodiment of the present invention, which, however, should not be taken limitative to the invention, but are for explanation and understanding only.

In the drawings:

FIG. 3A–3D is a block diagram showing the first embodiment of a transmission equipment according to the present invention;

FIGS. 7 to 9 show the relationship among a transmission equipment, an integrated state management device, and units in the prior art, in which FIG. 7 is a schematic block diagram of a conventional transmission equipment connected to an exchange, FIG. 8 is a block diagram showing the integrated state management device and the units, and FIG. 9 shows timing chart showing data exchange between the integrated state management device and the unit;

FIGS. 11 and 12 show procedure of checking of check SUM between the integrated state management device and the unit, in the prior art, in which FIG. 11 is a block diagram, and FIG. 12 is a timing chart showing a process of checking of check SUM;

FIGS. 13 and 14 show the principle of the second embodiment of the present invention, in which FIG. 13 is a block diagram and FIG. 14 is a timing chart showing a process of updating data between the integrated state management device and the unit;

FIGS. 17 and 18 are charts showing operation of the second embodiment of the invention, in which FIG. 17 shows process of checking check SUM, and FIG. 18 shows process of checking check SUM using a command.

DESCRIPTION OF THE PREFERRED EMBODIMENT

In order to facilitate full understanding of the first embodiment of the invention, brief discussion for the prior art will be given with reference to FIGS. 1A to 1C, in advance of discussion for the first embodiment of the transmission equipment.

Figure 1:
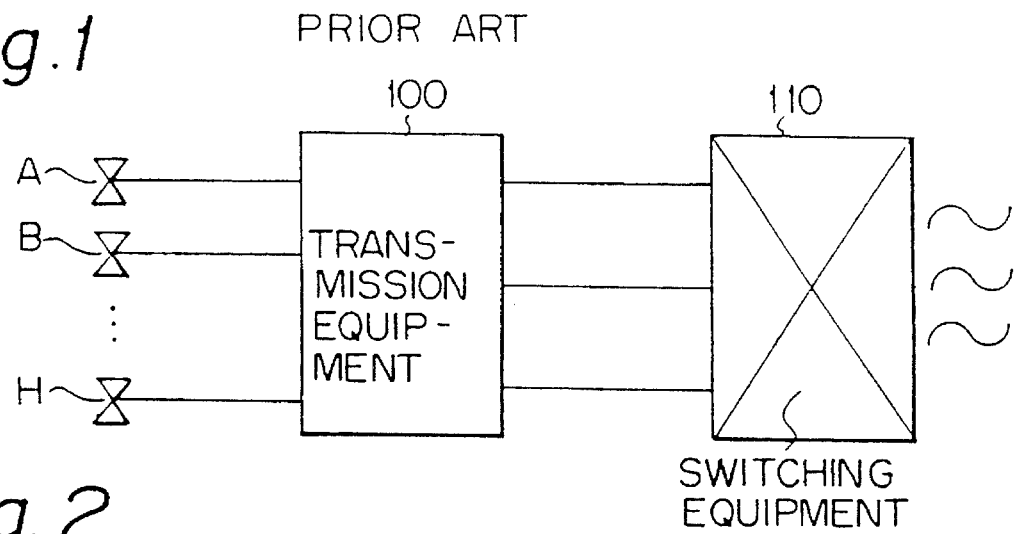
FIG. 1 is a block diagram showing a conventional transmission system.

As shown in FIG. 1, it has been performed to connect user terminals A, B, . . . , and H to a transmission equipment 100, and to connect to another user terminal which is also connected to another transmission equipment (not shown), through an exchange 101, for communication.

Figure 2:
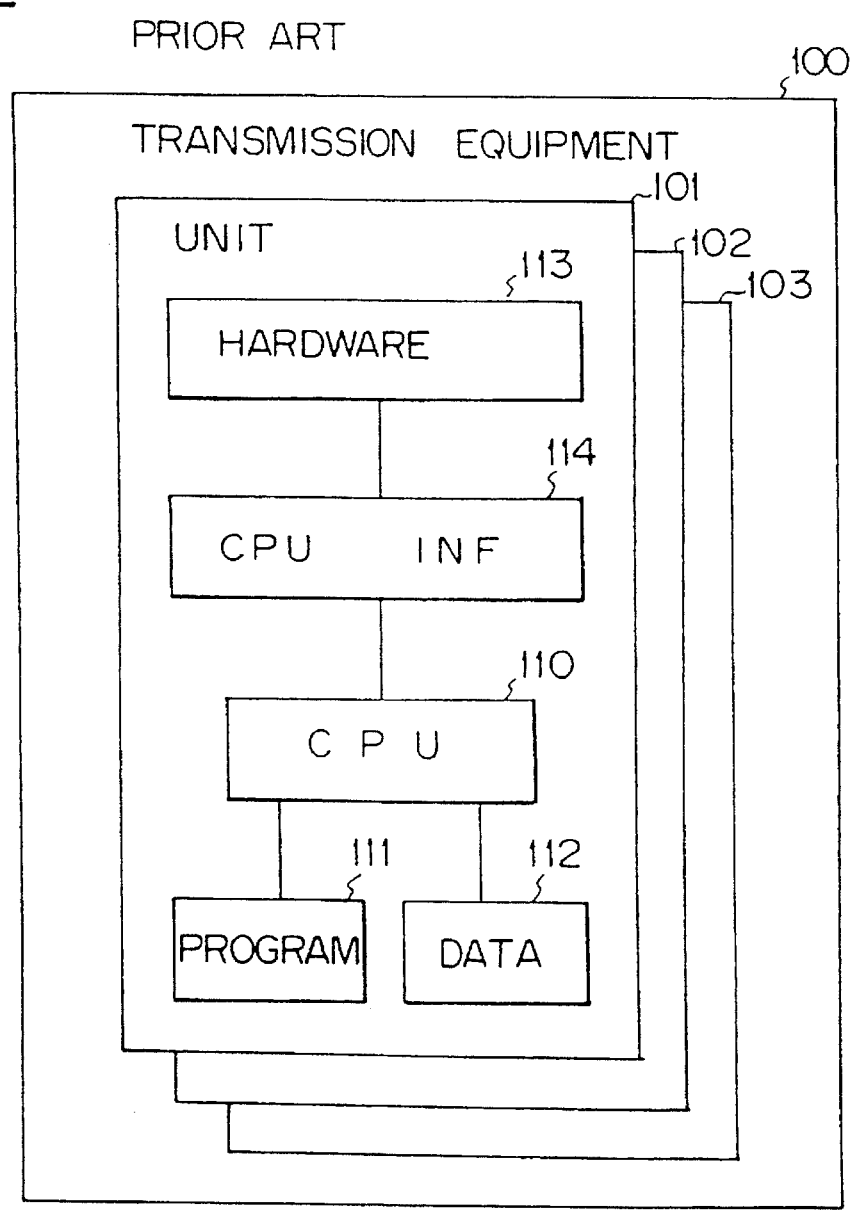
FIG. 2 is a block diagram showing a conventional transmission equipment.

In such a case, as shown in FIG. 2, in order to realize a higher performance of the transmission equipment, each unit 101,102,103 . . . forming the transmission equipment is provided with a CPU 110, a program storing unit 111 for holding a program for controlling the CPU 110, a data storing unit 112 for holding set data for designating selected function in the transmission equipment, performance data indicative of qualities of lines and so forth, a hardware 113, such as a display unit and so forth, CPU interface as an interface between the hardware and CPU, and so forth.

In order to realize higher performance, conventionally, for each unit in the transmission equipment, a CPU and a program are installed and data is managed independently in the unit. When data back-up, program down-loading, self-diagnosis is to be realized in such architecture, it becomes necessary to establish dual system for all units. For example, when each unit is not duplicated, even when data back-up is performed in a unit, if the unit goes breakdown to be replaced, the back-up data are also lost so that the back-up becomes meaningless. Therefore, for back-up, separate units have to be provided. Accordingly, installation efficiency of the transmission equipment is degraded. If the dual system is not employed for each unit, however, there is a problem that the above-mentioned function, such as data back-up, cannot be practically realized.

The drawback in the prior art set forth above can be solved in the first embodiment of the transmission equipment according to the present invention, which will be discussed hereinbelow.

Figure 3B:
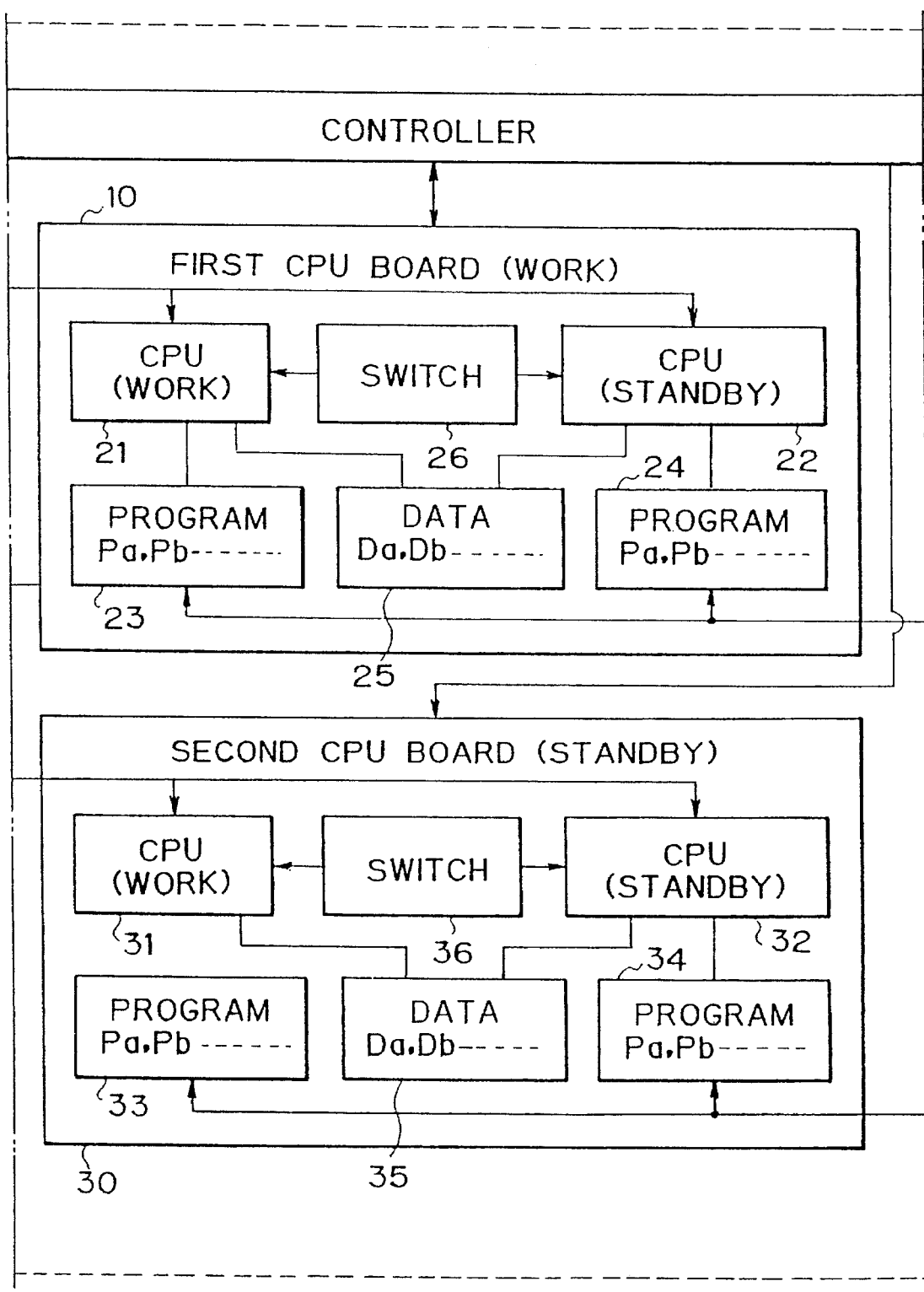
Figure 3C:
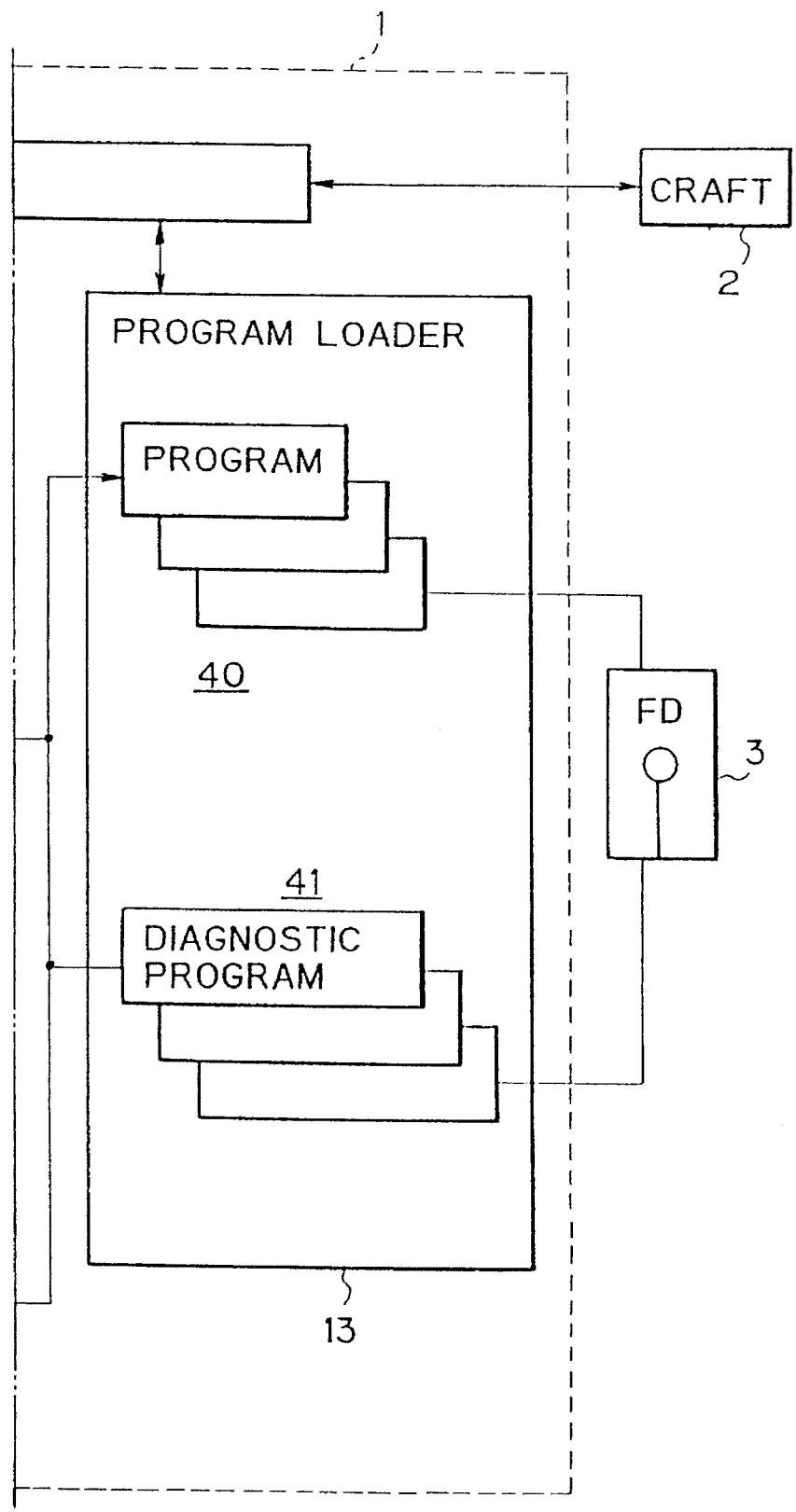

Referring now to FIG. 3, according to the first embodiment of the present invention, a transmission equipment 1 is provided with a first CPU board 10 for working and a second CPU board 30 for standby, to make CPUs and programs which are distributed to respective units in the prior art, into concentrated in the first and second CPU boards 10 and 30.

The first CPU board 10 is provided with a working CPU 21, a standby CPU 22, program storing units 23, and 24 for respective CPUs 21 and 22, a data storing unit 25 and so forth. Similarly, the second CPU board 30 is provided with CPUs 31 and 32, program storing units 33 and 34 and a data storing unit 35.

In addition, a data back-up unit 14 is connected to the first and second CPU boards 10 and 30. The data back-up unit 14 is formed by a non-volatile memory. The data back-up unit has a first CPU board writing region 14-1 and a second CPU board writing region 14-2. These regions hold the contents thereof even when the power supply for the transmission equipment 1 is turned off.

Now, data entered from users A, B, . . . are input to the working first CPU board 10 and the standby second CPU board 30 through units 16, 17, . . . , a CPU interface 15, and a CPU hoard switching unit 12. At the first CPU board 10, they are processed by the working CPU board 21 to be changed into data Da, Db . . . and are written in the data storing unit 25. Simultaneously, the data Da, Db, . . . are written in the data back-up unit 14.

Similarly, in the second CPU board 30, the data are processed by the CPU 31 to be changed into the data Da, Db, . . . and are written in the data storing unit 35 and also in the data back-up unit 14.

For example, if data destruction is caused in the first CPU board 10, a CPU board switching request is sent from the first CPU board 10 to the controller 11. The controller 11 is responsive to this to control the CPU switching unit 12 to switch the first CPU board 10 to be a standby board and to switch the second CPU board 30, to be a working board.

Then, in the first CPU board 10, in which data is destroyed, the correct data is read out from the data back-up unit 14 and written therein. Once the recovery of the internal data in the first CPU board 10 is completed, the first CPU board 10 sends the controller 11 a notice that the first CPU board 10 has become normal.

It should be noted that the standby CPUs 22 and 32 become necessary for down-loading of problem, which, will be discussed later.

Figure 4:
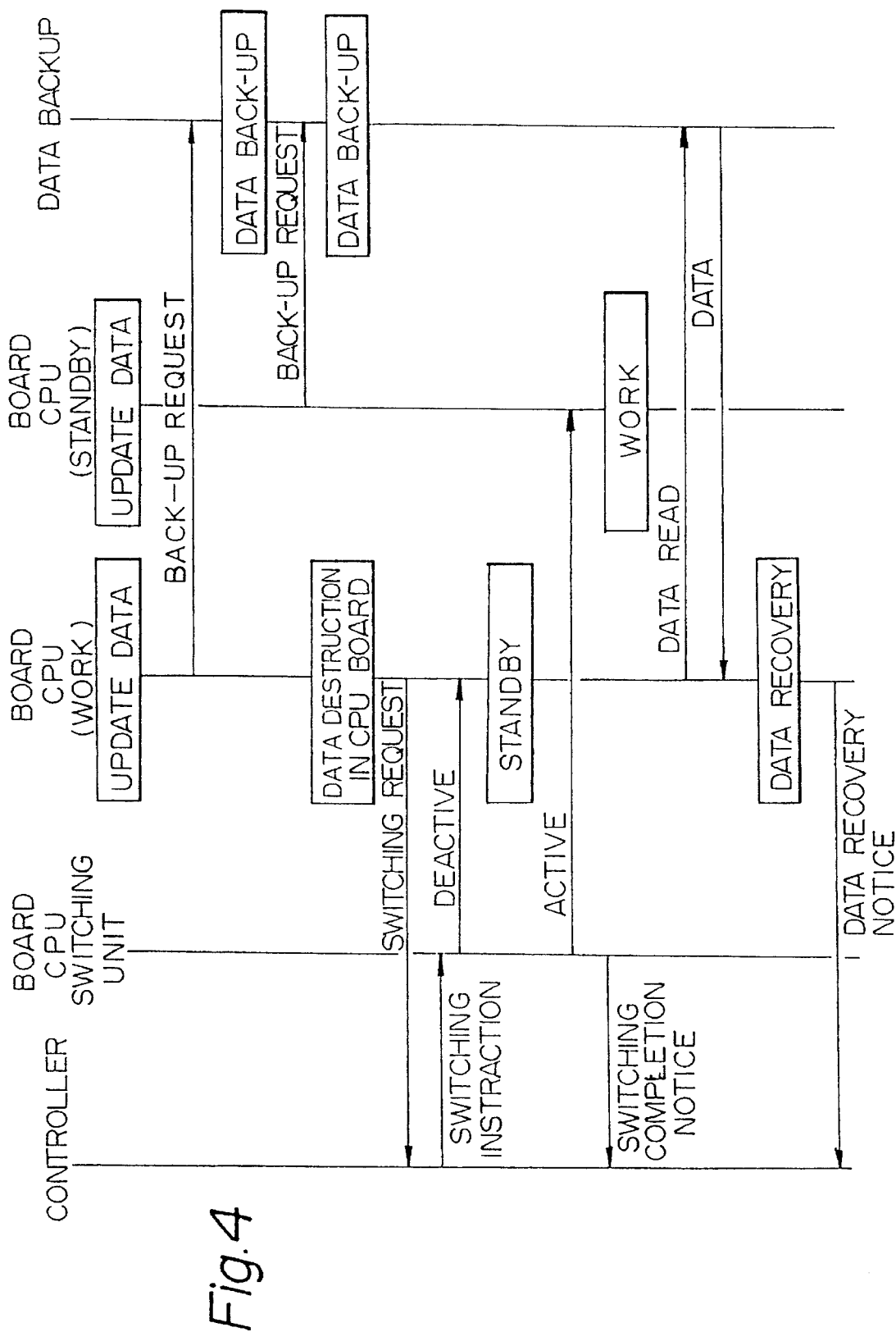
FIG. 4 is an explanatory chart showing procedure of data back-up and data recovery to be performed in the first embodiment of the transmission equipment of FIG. 3.
Figure 5:
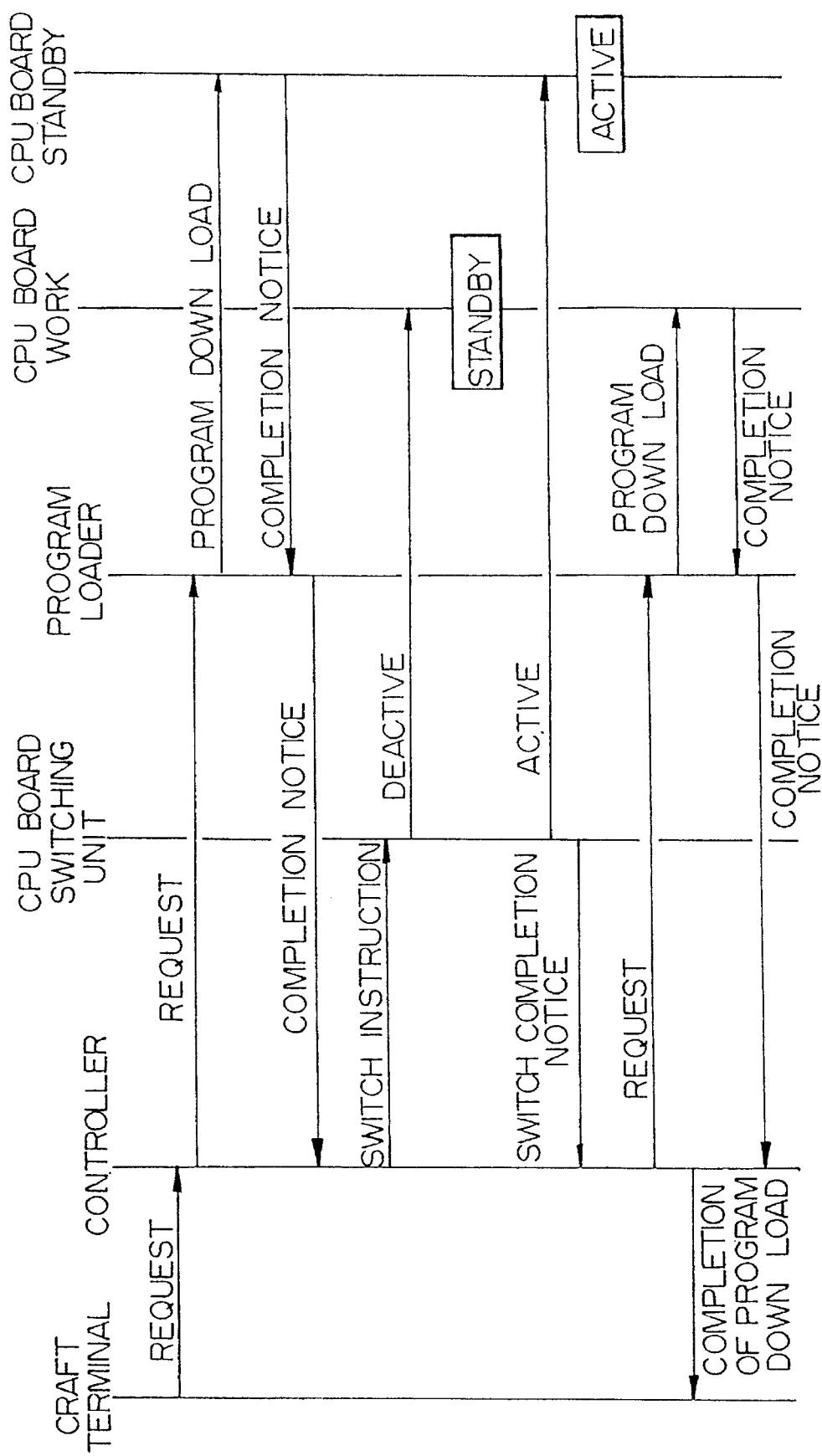
FIG. 5 is an explanatory chart showing procedure of program down-loading to be performed in the first embodiment of the transmission equipment of FIG. 3.
Figure 6:
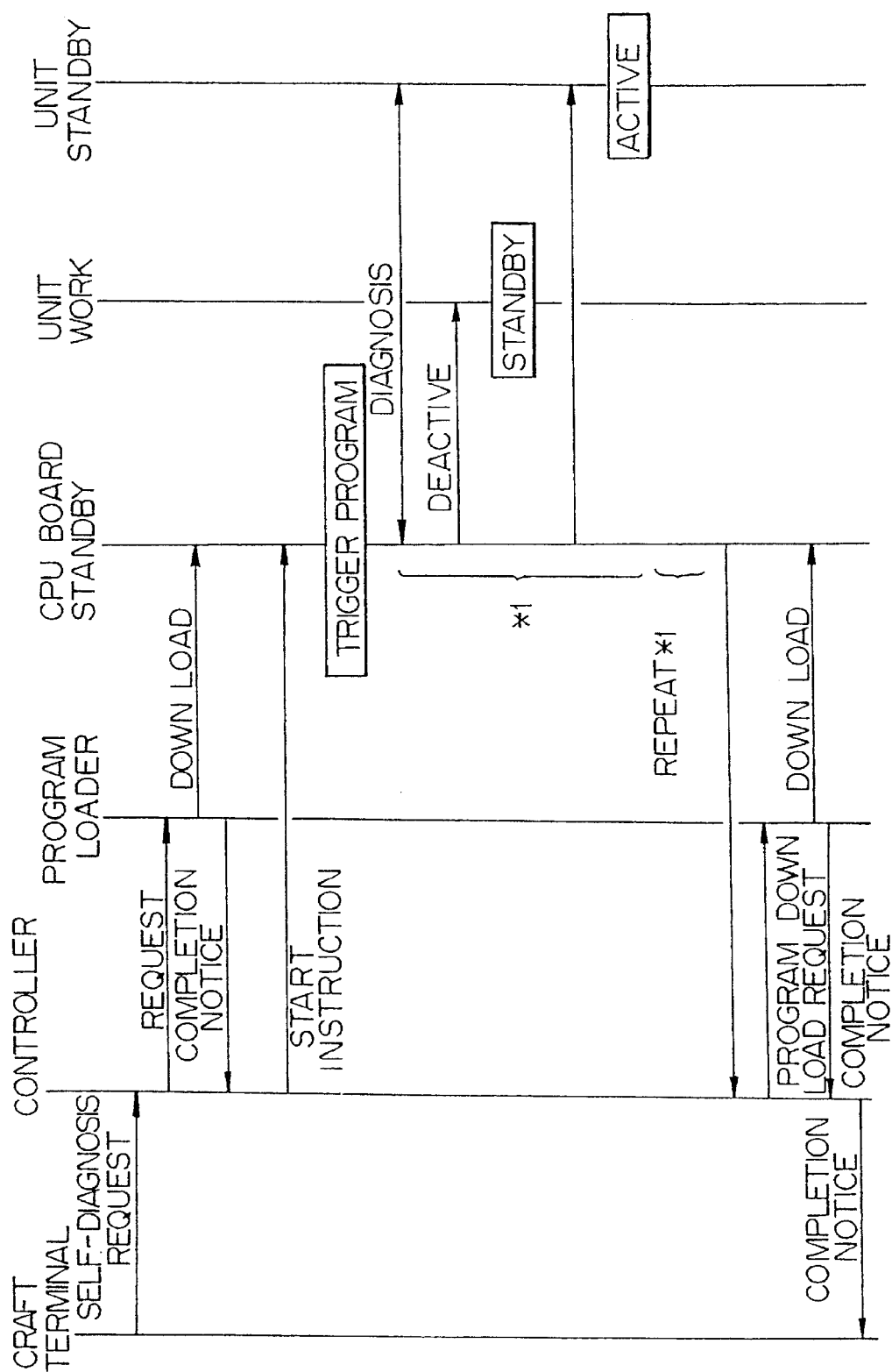
FIG. 6 is an explanatory chart showing procedure of self-diagnosis to be performed by the first embodiment of the transmission equipment of FIG. 3.

Further detail will be discussed with respect to the first embodiment of the present invention with reference to FIGS. 3 to 5, in which FIG. 3 is a constructional illustration of one embodiment of the present invention, FIG. 4 is an explanatory illustration showing procedure for recovery of the back-up data, FIG. 5 is an explanatory illustration showing procedure for program down-loading, and FIG. 6 is an explanatory illustration showing procedure for self-diagnosis program.

In FIG. 3, the reference numeral 2 denotes a craft terminal interface which is used for down-loading a program, inputting setting data, for entering data for manual control of self-diagnosis program.

The reference numeral 3 denotes a floppy disk, on which programs and so forth to be down-loaded are written.

The first CPU board is provided with a switching unit 26 in addition to the foregoing construction, for switching control of the CPU 21 and CPU 22 between working and standby.

The reference numeral 13 denotes a program loader which performs a process for down-loading a program and executing the self-diagnosis program.

The reference numerals 16, 17 and 18 denote working units, and 19 denotes a standby unit provided for the working units. Accordingly, when a failure is caused in one of the working unit, the unit 19 becomes a working unit instead of the failure working unit. It should be noted that, in FIG. 3, transmission lines, which can be considered as lines from an exchange, from the users A, B and C and switching unit between these units are omitted.

The second CPU board is also provided with a switching unit 36 for switching the CPU 31 and the CPU 32 between working and standby.

In the transmission equipment, monitoring of line conditions, for example, is performed. When an abnormal condition of a line is detected, the abnormal line is switched to a standby line. Therefore, the performance data of lines, such as line error rate, is checked so that a switching of a line is performed when the error rate is gradually increased to lead judgment for abnormality. To this end, the CPU 21 and the CPU 31 perform such calculation and checking function. Of course, in case that process amount is large, approach has to be taken to increase capacities of the CPU in respective CPU board corresponding to the process amount, or to increase the number of CPUs to be used.

The operation of the first embodiment of the present invention will be discussed hereinafter in terms of procedures for data back-up and data recovery, program down-loading and self-diagnosis, respectively.

A. Procedure for Data Back-Up and Data Recovery (see FIG. 4)

(1) When line data, such as attribute of data which may includes speed, signal type and so forth are input to the transmission equipment 1 from the units 16, 17, . . . , the data are transferred to the first CPU board 10 and the second CPU board 30 through the CPU interface 15 and the CPU board switching unit 12. The data are then processed by CPUs 21 and 31 by checking an error or by checking whether or not each unit has data. If the check is OK, the contents of the data storing units 25 and 35 are updated by the new data from the units 16, 17, . . .

(2) After updating, the CPU 21 of the first CPU board 10 issues a back-up request for the data back-up unit 14. By this, the data in the first CPU board write region 14-1 is updated. Similarly, the CPU 31 of the second CPU board issues the back-up request to perform data back-up in the second CPU board write region 14-2. Thus, the contents in the units 16, 17, . . . and the contents in the data storing units 14-1 and 14-2 coincide.

(3) while the transmission equipment 1 is operating as set forth above, if a destruction of data is detected upon reading out the data held in the data storing unit 25 in the first CPU board 10, the CPU 21 of the first CPU board 10 issues a CPU board switching request to the controller 11.

(4) The controller 11 is responsive to this to output a CPU board switching command to the CPU board switching unit 12. By this, the CPU switching board switching unit 12 switches the first CPU board 10 into deactive state as standby and the second CPU board 30 into active for working.

(5) The first CPU board 10 thus becomes standby board performs data read from the data back-up unit 14 to read out data in the first CPU board write region 14-1, and to replace the faulty data in the data storing unit 25 with read out data. After completing recovery of the internal data, the CPU 21 sends a notice for recovery and thus report the ready state to return into the working board, The controller 11 may respond to this to again perform control to make the first CPU board 10 into working and the second CPU board 30 into standby. Of course, it is possible to maintain the first CPU board as standby board.

B. Procedure for Program Down-Loading (see FIG. 5)

(1) When a program is to be down-loaded, since the operator enters a program down-loading request through the craft terminal 2, the program down-loading request is transmitted to-the controller 11 via a craft terminal interface.

(2) The controller 11 decodes the request and recognize that it is the program down-loading request. Then, the controller 11 commands to the program loader 13 to effects a program down loading into the standby state second CPU board 30.

(3) By this, the program loader 13 triggers a program for down-loading held in a storing unit 40 to read out a designated program to be down loaded and write in the program storing unit 34 through the CPU 32 of the second CPU board. At this time, the CPU 32 performs checking for presence or absence of error in the down loaded program. If there is no error, the CPU 32 makes the CPU 31 to write in the program in the program storing unit 33. Once down loading of the program for the second CPU board 30 is completed, the notice for completion is send to the program loader 13.

(4) The program loader 13 is responsive to the notice for completion to issue a notice for completion to the controller 11.

(5) Then, the controller 11 issues the CPU board switching command to the CPU board switching unit 12. By this, the CPU board switching unit 12 makes the first CPU board 10 into deactive state as standby board and the second CPU board 30 into active state for working. Thereafter, a switching completion is noticed to the controller 11.

(6) By this, the controller 11 performs request for program down loading for the program loader 13.

(7) By this, the program loader 13 performs program down loading to the CPU 22 in the similar manner. The CPU 22 performs an error check on the loaded program. If there is no error, the CPU 22 sends a notice for completion to the program loader 13 when the program down-loading for the CPU 21 is completed. The program loader 13 is responsive to this to send a notice for completion to the controller 11.

(8) When the second notice for completion is received from the program loader 13, the controller 11 recognizes that the program loading for the two CPU boards are completed and sends a notice for program down-loading completion to the craft terminal 2.

C. Procedure for Self-Diagnosis (see FIG. 6)

A self-diagnosis is taken place in response to command entry through the craft interface. In the alternative, a self-diagnosis operation can be taken place automatically at given timings set in a timer. The following discussion for the process is given for the self-diagnosis operation triggered by manual entry of the command through the craft terminal 2.

(1) A self-diagnosis request is entered through the craft terminal, This self-diagnosis request is decoded by the controller 11. The controller 11 sends a request for the program loader 13 to down load a self-diagnosis program for the second CPU board 30 as the standby CPU board.

(2) The program loader 13 at first reads out the program from the program storing unit 34 of the second CPU board 30 and saves it in the program storing unit 40. Then, the program loader 13 writes the self-diagnosis program held in a self-diagnosis program storing unit 41 to the program storing unit 34 of the second CPU board 30. The CPU 32 checks whether or not an error is present in the transmitted self-diagnosis program. If there is no error, the CPU 32 transfers the program to the program storing unit 33. Thus, the down-loading of the self-diagnosis program is performed.

(3) After down loading as set forth above, the program loader 13 issues a notice for completion of down-loading of the self-diagnosis program. Based on this, the controller 11 sends a command for initiation of self-diagnosis for the second CPU board 30. By this, the second CPU board triggers the self-diagnosis program to initiate self-diagnosis operation.

(4) The self-diagnosis operation is at first performed for the standby unit 19. This is carried out in such a way that a test signal generator 50 is connected through a switching unit 51 to the unit 19 under the control of the second CPU board 30. Then, a test signal is sent from the test signal generator 50 to the standby unit 19. After determination that the standby unit 19 is in normal state, the second CPU board 30 makes the working unit 16 into deactive state, connects the user A to the standby unit 19 for which diagnosis has completed, by the switching unit 51. Then, for the unit 16 which now becomes a standby unit, diagnosis is performed.

(5) When the unit 16 is the normal state, the switching unit 51 connects the user B to the unit 16 for working and makes the unit 17 into standby state for performing diagnosis thereof. Through this process, self-diagnosis for all units is performed.

(6) When diagnosis of all units is completed, the second CPU board 30 reports completion of diagnosis to the controller 11. The controller 11 is responsive to this report to issue a down-loading request for the program loader 13 so that the program read out from the program storing unit 34 of the second CPU board 30 and held in the program storing unit 34, is returned to the diagnostic program storing unit 40. By this, similarly to the above, the program is down-loaded. Once down-loading of the program is completed, the program loader 13 issues a notice for completion to the controller 11. The controller 11 is responsive to this to notice for completion of self-diagnosis to the craft terminal.

It should be appreciated, in case of performing self-diagnosis for the units, 16, 17, 18 . . . , it may be possible to provide a testing signal from the test signal generator 50 which is responsive to a diagnosis command from the standby one of the first and second CPU boards 10 and 30. The test signal generator 50 as triggered by the diagnosis command feeds testing signal through a switch 51 to one of the unit which is set as standby state to perform diagnosis operation, as shown in FIG. 3.

At this time, it may possible to return the unit 19 into the standby state again. In the foregoing discussion, the self-diagnosis program is triggered in response to the enter from the craft terminal. However, it is, of course, possible to automatically trigger the self-diagnosis program depending upon the condition of the transmission equipment.

According to the first embodiment of the present invention, CPUs conventionally distributed for respective of the units are concentrated into the CPU board, data can be concentrated. As a result, it becomes possible to arrange working CPU and standby CPU and CPU boards for working and for standby and thus enables to realize respective functions of data back-up, program down-loading, self-diagnosis and so forth with limiting necessity of establishment of the redundant unit in the CPU board and limited hardware. Therefore, respective functions which are frequently required by the customer can be realized in the limited installation space. As a result, the first embodiment of the present invention may significantly contributes for progressing for development of the transmission into an intelligent network elements.

Next, the second embodiment of the present invention will be discussed. In advance of discussion, brief discussion for the prior art will be given with reference to FIGS. 7 to 9, for facilitating better understanding of the invention.

Figure 7:
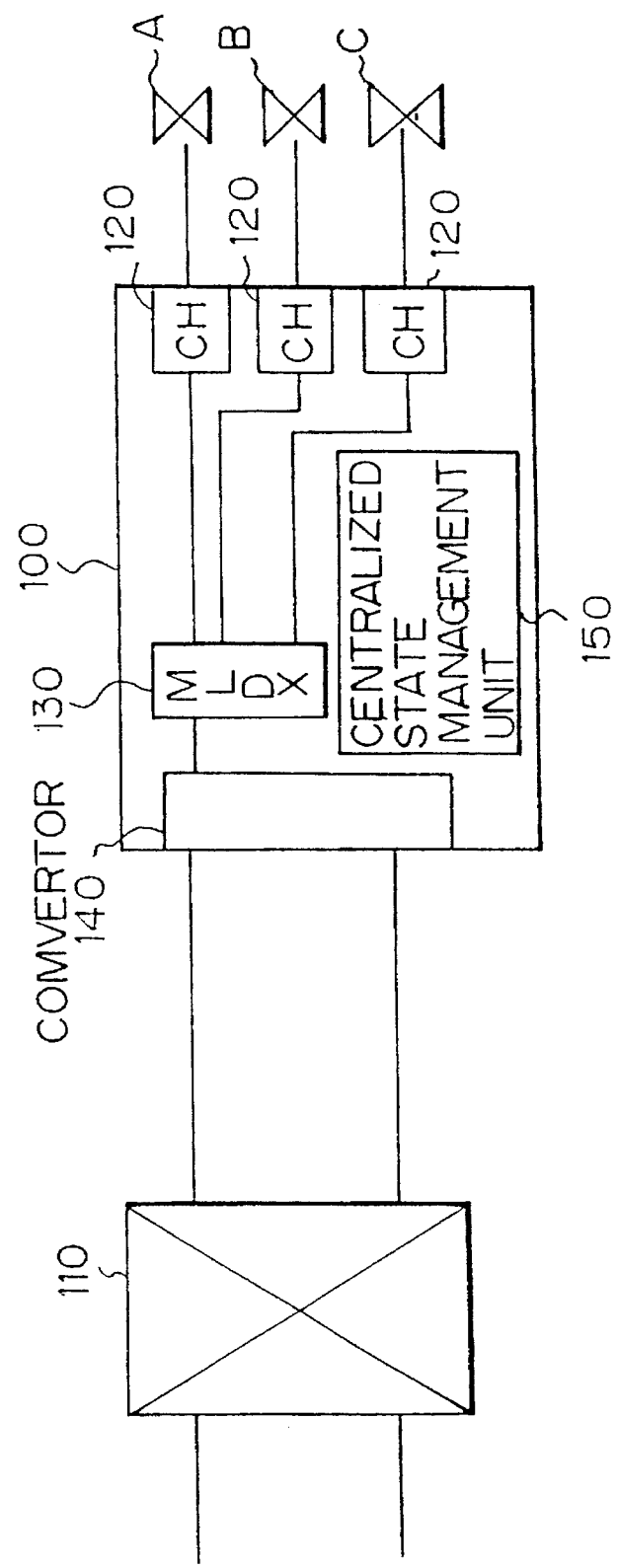

FIG. 7 shows a conventional construction of a telephone network system, in which a transmission equipment 100 connected to subscriber terminals A, B , . . . C is connected to an exchange 110 for communication with other subscribers. The system shown in FIG. 7 is substantially the same as the system shown in FIG. 1. The subscriber terminals A, B , . . . C are connected to channels 120. The channels 120 are connected to a multiplexing/demultiplexing unit (MLDX) 130. By this, the signal from the terminal is multiplexed and fed to a bipolar/unipolar converting unit 140. The bipolar/unipolar converting unit 140 thus feeds bipolar digital multiplexed signal to the exchange 110.

Conversely, the signal supplied from the exchange 110 to the bipolar/unipolar converting unit 140 is converted into an unipolar signal and supplied to the multiplexing/demultiplexing unit 130. The multiplexing/demultiplexing unit 130 separates the muitiplexed signal to feed to the destination subscriber through the corresponding channel 120. In case that the subscriber terminal is an analog signal terminal, the signal to be fed to the subscriber is converted into an analog signal.

In the transmission equipment, these channels 120 are formed as one unit. Also, the multiplexing/demultiplexing unit 130 and the bipolar/unipolar converting unit 140 form respective units. An integrated state management device 150 manages the states of these units. The state information to be managed by the integrated state management system includes an error state, service state and so forth, for example. On the other hand, in the units, the transmission signals are processed according to respective functions provided for the units.

In order to answer the requirement for higher speed of the data processing and effectively using the memory, the integrated state management device 150 must operate in sufficiently high data processing speed and with effectively using the memory.

Figure 8:
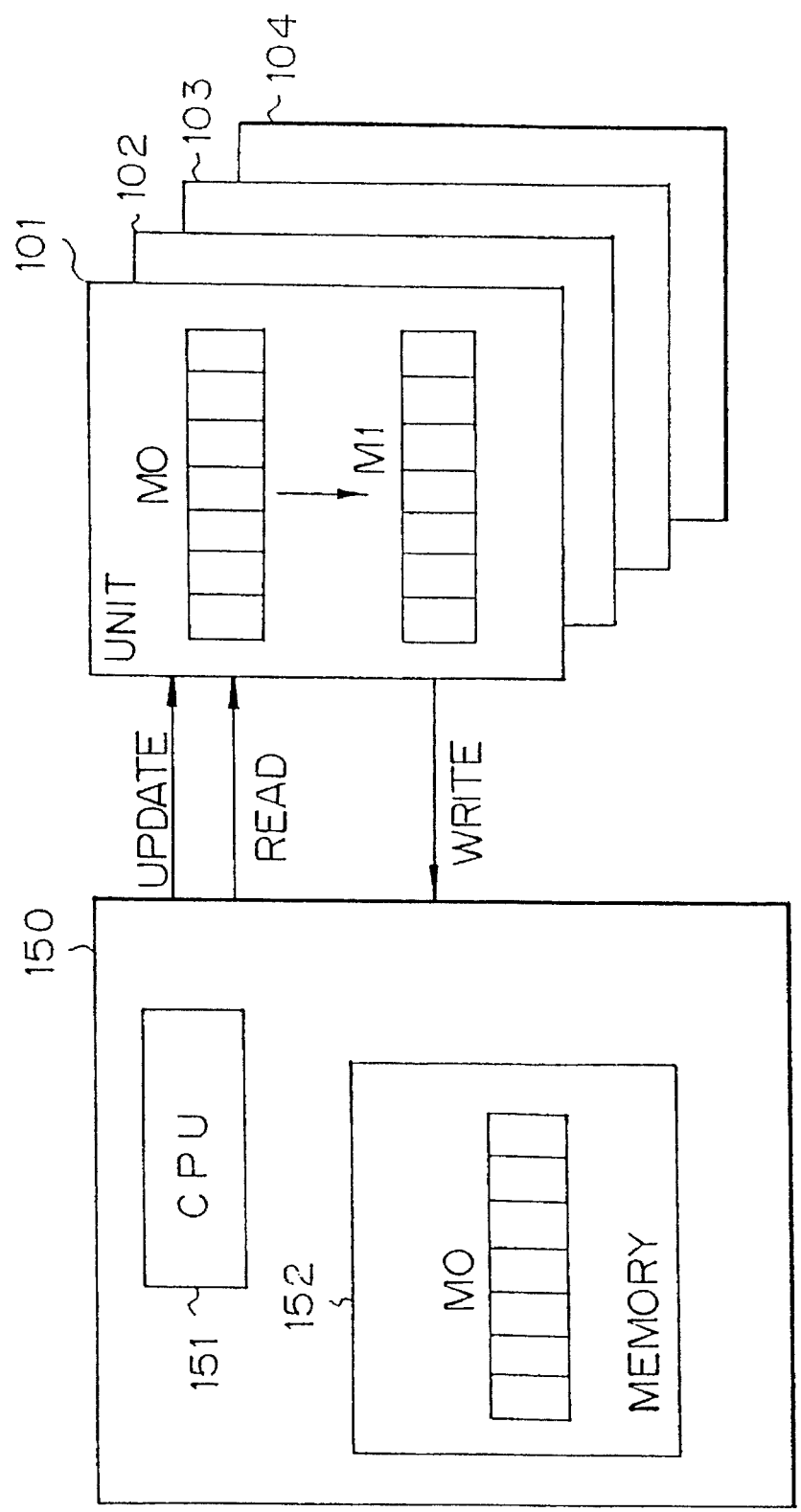
Figure 9:
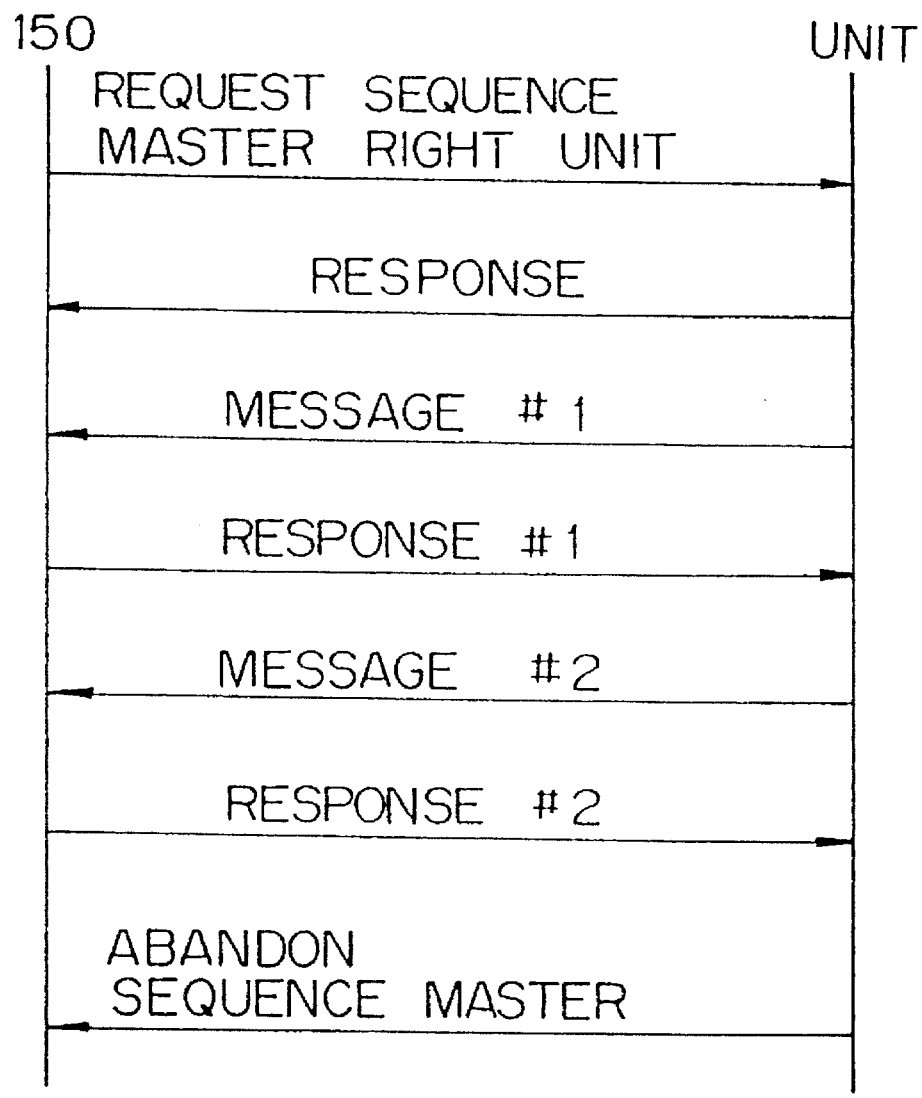

The conventional integrated state management device 150 and respective units and the operation thereof are shown in FIGS. 8 and 9.

As shown in FIG. 8, the integrated state management device 150 includes a CPU 151 and a memory 152, Similarly, CPUs and memories are provided for respective of the units 100,101,102,103 , . . .

As shown in FIG. 9, the integrated state management device 150 effects polling for one of a plurality of units 100,101,102,103, . . . to request for a sequence master right. Namely, the integrated state management device 150 requests for use, if necessary, of the right for accessing the memory 152. In response to this, the polled unit generates a read request as a message #1 responding to the sequence master right request, when a state data is to be modified.

The integrated state management device 150 then returns an approving response in response to the response message #1.

The unit is responsive to the approving response to send an address to access as a message #2.

The integrated state management device 150 is responsive to this message #2 to read out the data in the corresponding address to feed the read data to the unit. The unit then performs process using the received data.

When accessing of the memory 152 of the integrated state management device 150 becomes unnecessary for the unit, abandon of the sequence master right is noticed. Then, the right of use of the memory 152 is disappeared.

Figure 10:
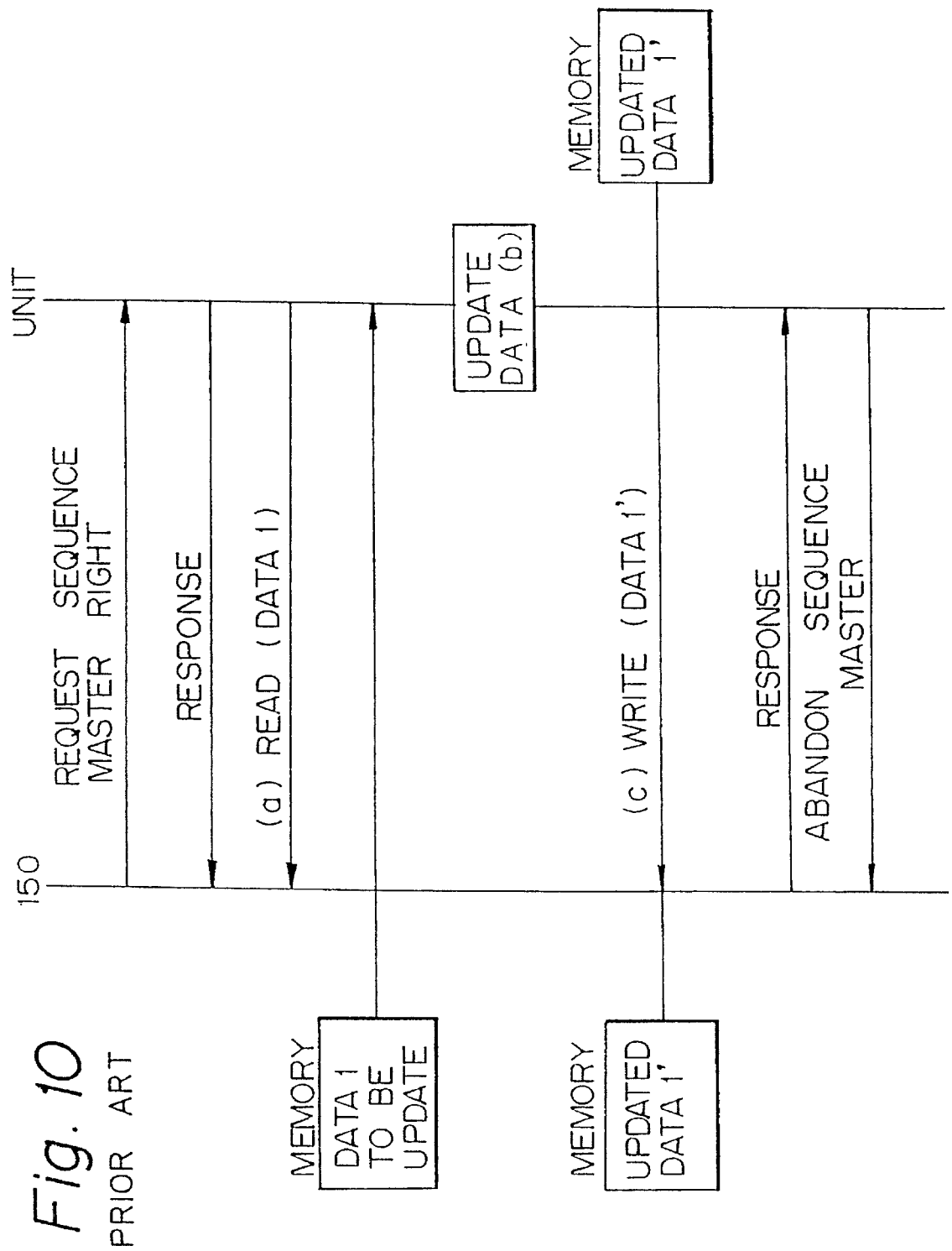
FIG. 10 is an explanatory chart showing procedure of updating data between the integrated state management device and the unit, in the prior art.

Next, in the conventional process, in which the unit obtains data from the memory of the integrated state management device and requests storing of the data to the memory of the integrated state management device, will be briefly discussed with reference to FIG. 10.

In response a sequence master right request from the integrated state management device 150, the unit generates a response to the sequence master right request.

(a) Then the unit generates a read request and provides the address of data 1 to be updated to the integrated state management device. Based on this, the integrated state management device reads out the data (DATA 1) from a memory sends it to the unit.

(b) The unit then performs updating operation for the data DATA 1 in its memory and thus modifies the data to DATA 1'.

(c) Thereafter, the unit issues a write request to the integrated state management device and subsequently feed the updated data DATA 1' to the integrated state management device. The integrated state management device then writes the data DATA 1' in the designated address. Thereafter, a response to the write request is issued to the unit to notice that the writing is successfully completed. Based on this, the unit notifies abandon of the sequence master right. Then, the integrated state management device makes polling to send the sequence master right request for other unit. In this way, the contents in the integrated state management unit and the contents in the unit are made to be coincident.

In such a construction, when a memory board is to be added to the units for performing version up or for increasing the function, a check becomes necessary whether the contents in the memory in the integrated state management device and the statis data in the memory of the memory board are consistent with each other. As set forth above, in such case, checking of check SUM is performed.

Figure 11:
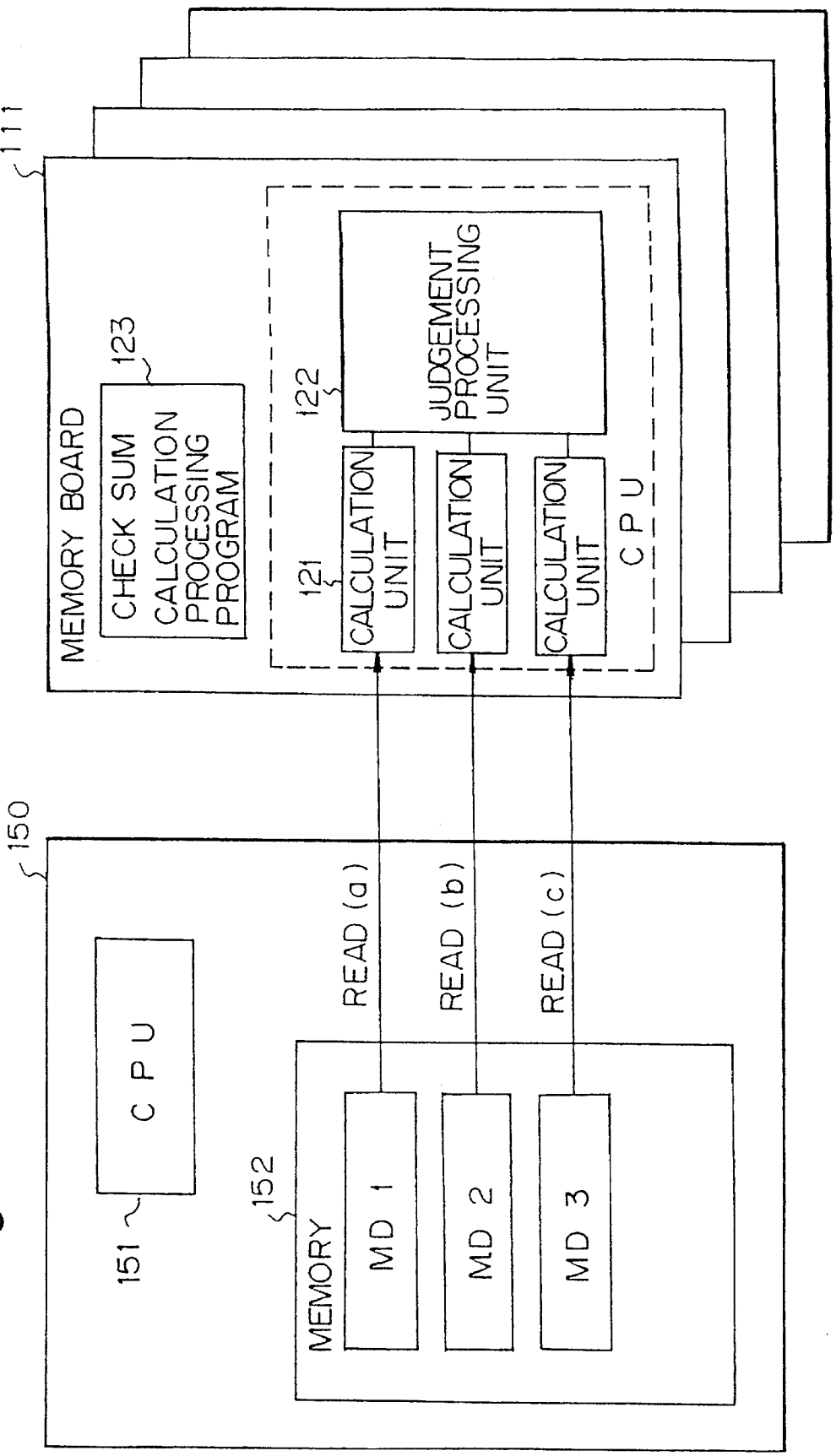

In the prior art, as shown in FIG. 11, when the units 120 are memory boards, and when the interface between the integrated state management unit 150 and the unit 120 only permits a read/write function, the unit 120 reads outs the memory data segments MD1, MD2, MD3 , . . . separately from the memory 152 of the integrated state management device 150, and then performs a check SUM calculation process in each calculation unit 121. The result of the calculation is then compared with the check SUM of the data held in the memory board of the unit 120 in a judgment unit 122 to make a judgment whether they are consistent with each other or not. Such process is performed by the CPU in the unit 120 with a check SUM calculation process program stored in the unit 120.

It should be noted that although FIG. 11 appears that three calculation units 121 simultaneously process MD1, MD2 and MD3, they performs process of the memory data segments MD1, MD2 and MD3 sequentially. The process set forth above is repeated constantly so as to maintain the data in the memory 152 of the integrated state management device 150 consistent with the data in the unit 120.

Figure 12:
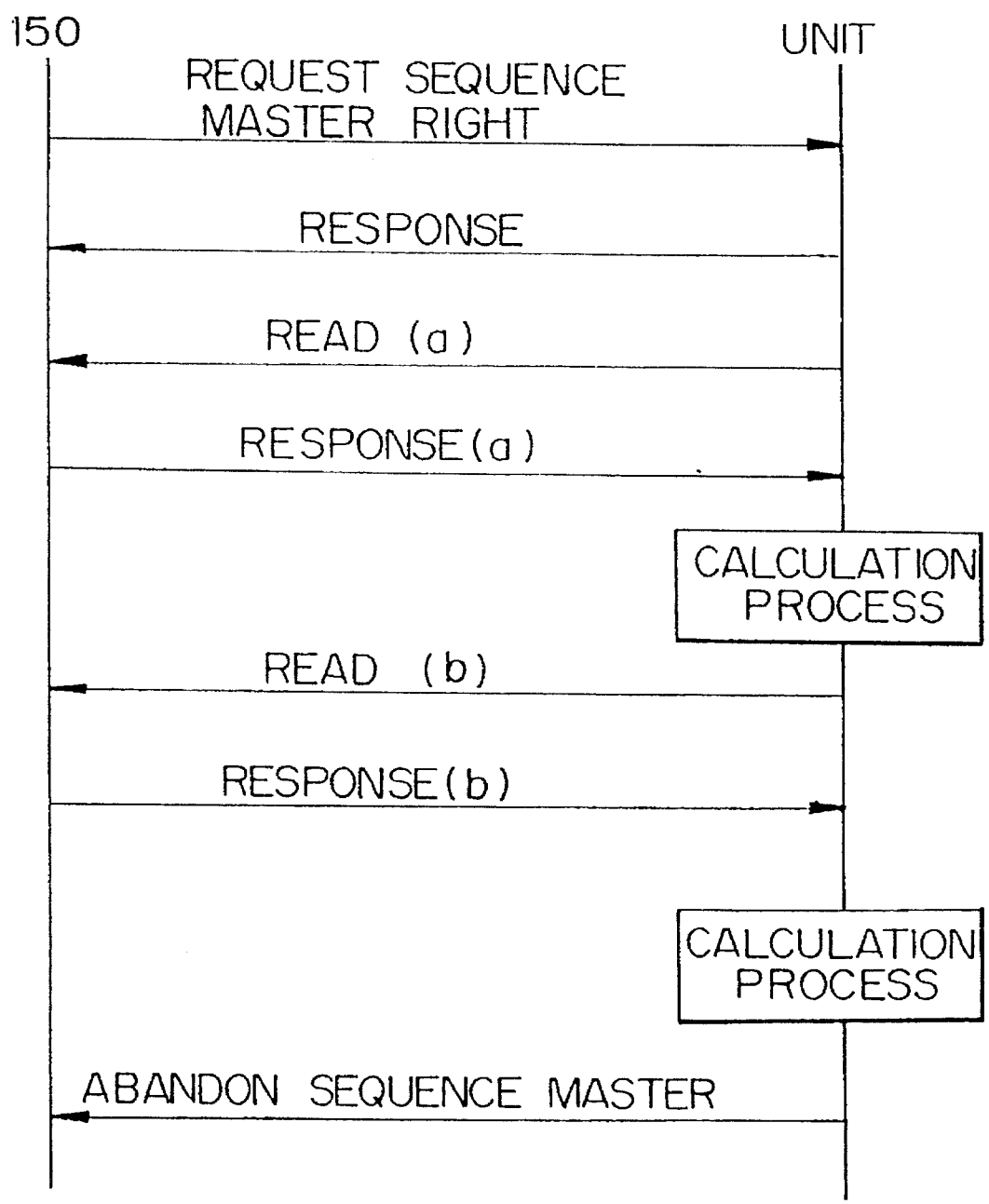
Figure 12:
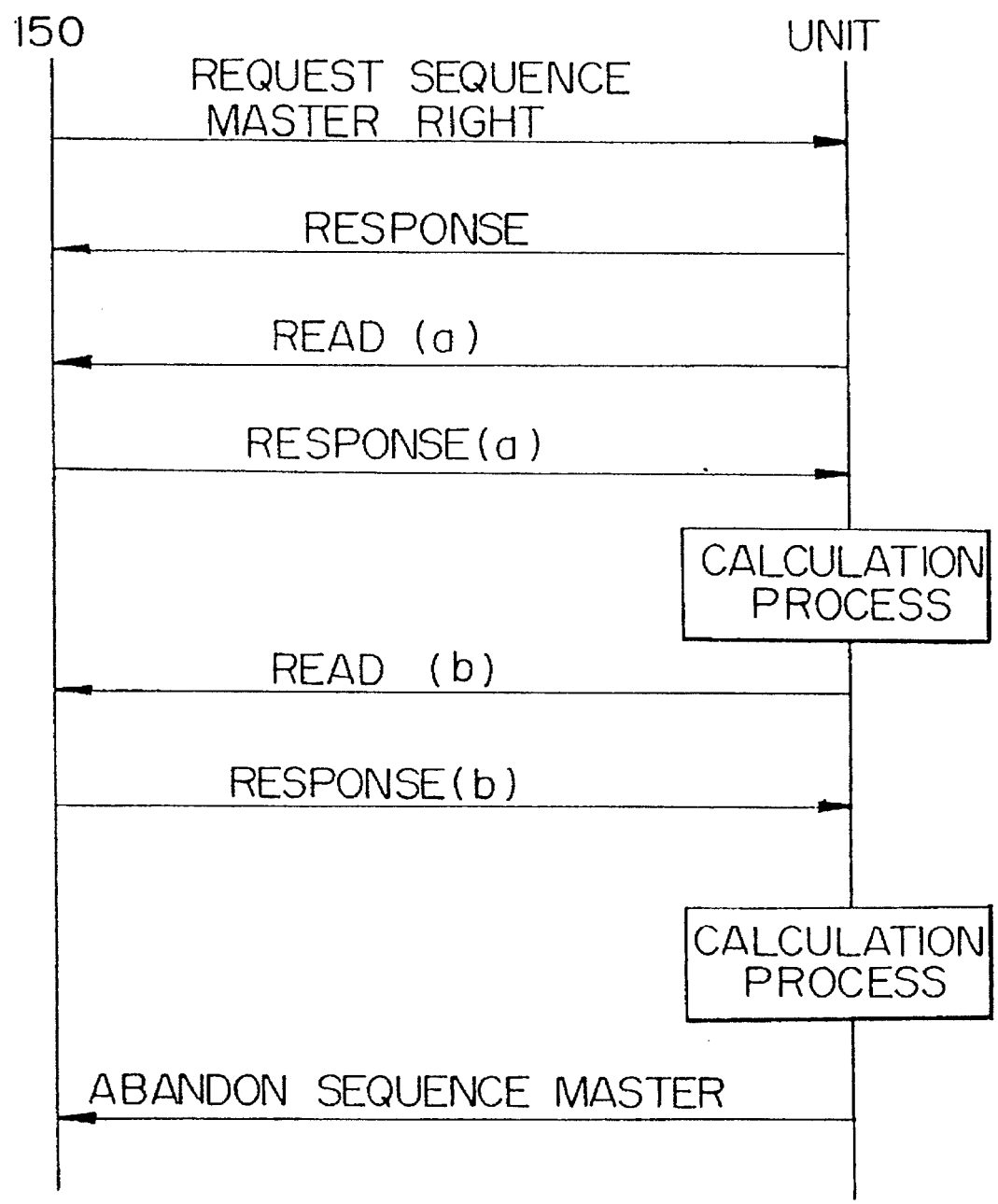

The sequence of this process will be briefly discussed with reference to FIG. 12. As set forth above, the integrated state management device 150 sends the sequence master right request for respective of the units 120 in order. The unit which requires the right responds to the request to obtain the sequence master right.

(a) Subsequently, the unit 120 issues a read request and sends the address of the memory data MD1. The CPU 151 in the integrated state management device 150 reads out the memory data MD1 from the corresponding address of the memory 152 and sends it to the unit 120. The unit 120 processes the data segment MD1 in the calculation unit 121.

(b) Then, the unit 120 issues a read request for the memory data segment MD2 and performs calculation process in the similar manner to the data segment MD1. The same process is performed for all necessary data segments. After all necessary process, the sequence master right is abandoned.

With this process, the number of sequence is increased according to the increase of the number of units. Furthermore, since the size of the data segments to read out in one sequence is determined depending upon the memory capacity of the unit, the number of sequences is further increased if the memory capacity is too small.

Further, when the interface permits functions other than the read/write function, the integrated state management device has to perform various functions according to the command. This requires addition of decoding means, processing programs and so forth every time a new command is added. For instance, a check SUM calculation process request command (CMD) may be added from the unit to the integrated state management device in accordance with an increase or modification of the functions.

The before described first embodiment of the present invention solved the above-mentioned problem by duplicating the integrated state management unit 150, namely, by providing the first and the second CPU boards 10 and 30 as shown in FIG. 3, so as to make the units as hardware only.

The problem set forth above in the prior art can also be solved by the second embodiment of the invention.

Figure 13:
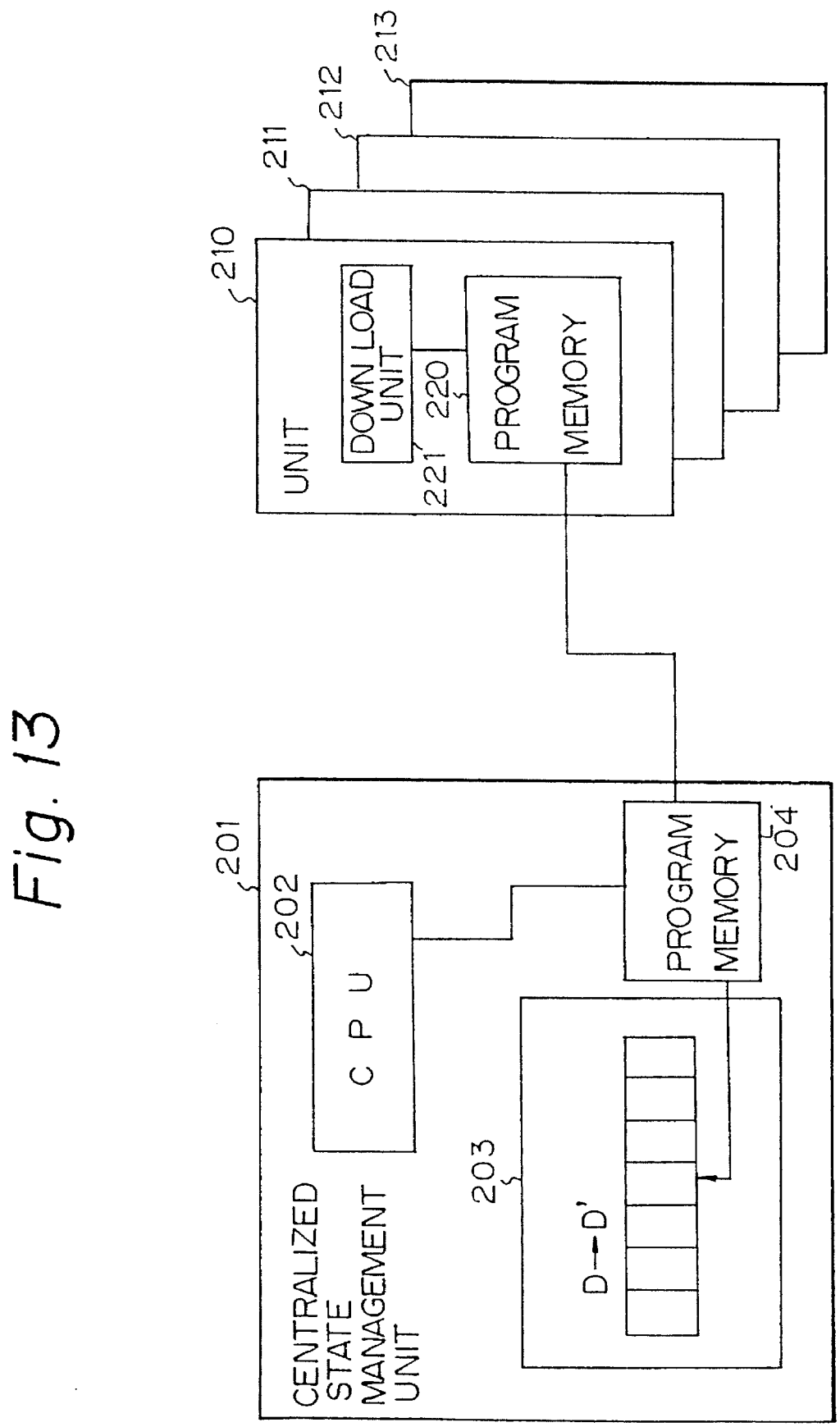

FIG. 13 shows the general construction of the second embodiment of a memory updating system for the integrated state management device, according to the second embodiment of the present invention. In the shown embodiment, an integrated state management device 201 has CPU 202, a memory 203, and a program memory 204 storing programs to be down-loaded. Numerals 210, 211, 212, 213 , . . . are units. Typically, the unit 210 has a program memory 220 for storing a programs to be down-loaded, and a down-loading unit 221. The program memory 220 includes memories for updating data as shown in FIG. 10 and for checking memory condition of the integrated state management device as shown in FIG. 11.

Figure 14:
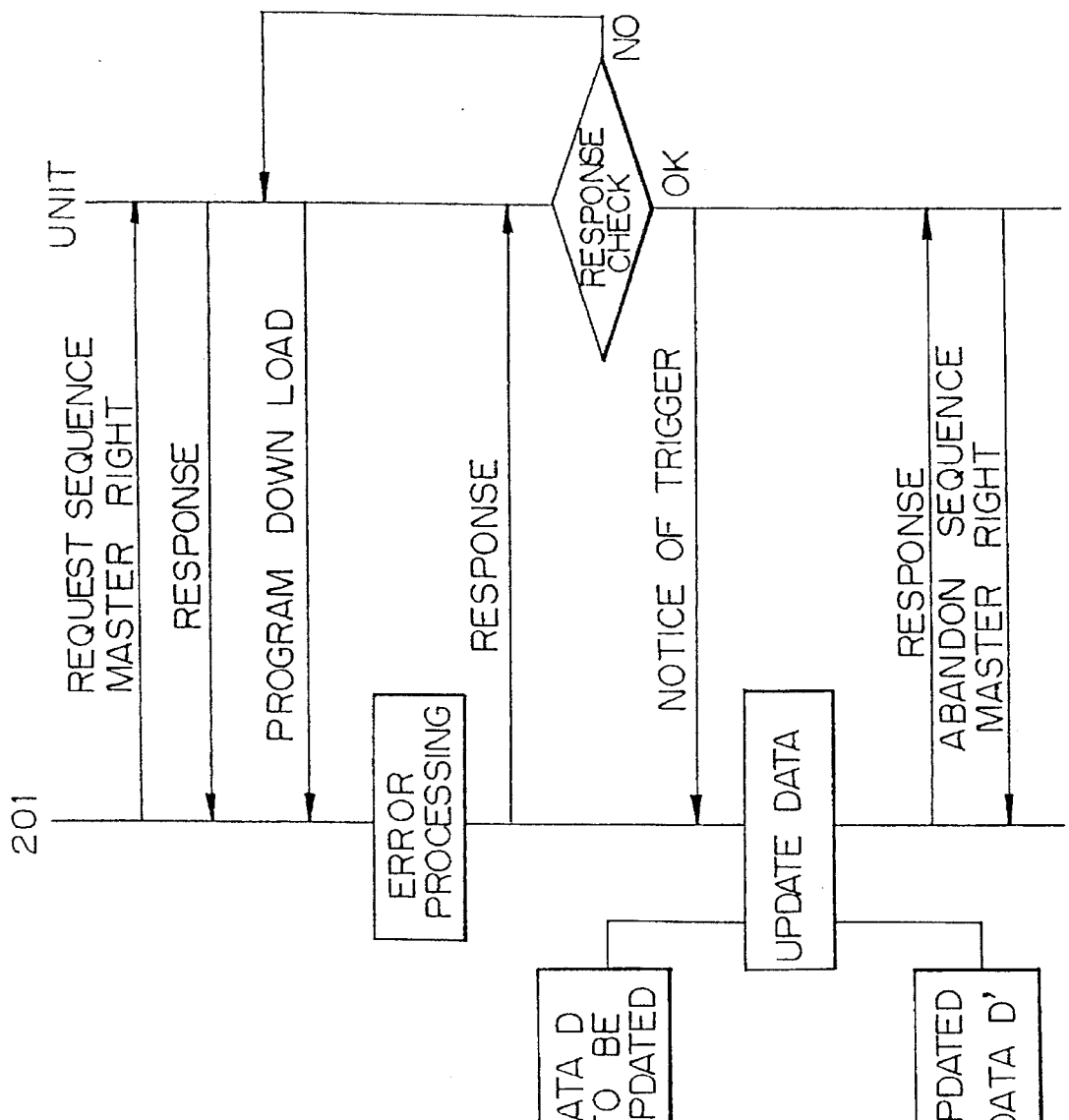

The process sequence of the system of FIG. 13 will be discussed herebelow with reference to FIG. 14 in terms of updating of the data.

(1) The integrated state management device 201 sequentially issues sequence master right requests to respective of units 210, 211 , . . . For example, when the unit 210 has updating data, the unit 210 responds to the sequence master right request to obtain the sequence master right.

(2) Then, the updating program and the updating data in the program memory 220 is supplied to the integrated state management device 201 by the down-loading unit 221.

(3) In the integrated state management device 201, once receiving the updating program and the updating data, an appropriate error processing, such as parity check, check SUM check and so forth, is performed in order to check the presence of transmission error. The result of error processing is sent to the unit 210.

(4) When the response from the integrated state management device 201 indicates NG, i.e. there is a transmission error, the process in (2) is re-tried by the unit 210. On the other hand, when no error in transmission is detected through the error processing, the unit 210 sends a notice for initiation to the integrated state management device 201.

(5) At this time, the above-mentioned updating program has been written in the program memory 204. Therefore, the CPU 202 performs data updating process by the updating program in the program memory 204. Namely, in the data updating process, the data D to be updated is read out from the memory 203 and update the read data D by the data D' supplied from the unit 210. The updated data D' is then stored in the memory 203. Thereafter, the result of updating operation is notified to the unit 210. The unit 210 is responsive to this notice to abandon the sequence master right.

Figure 15:
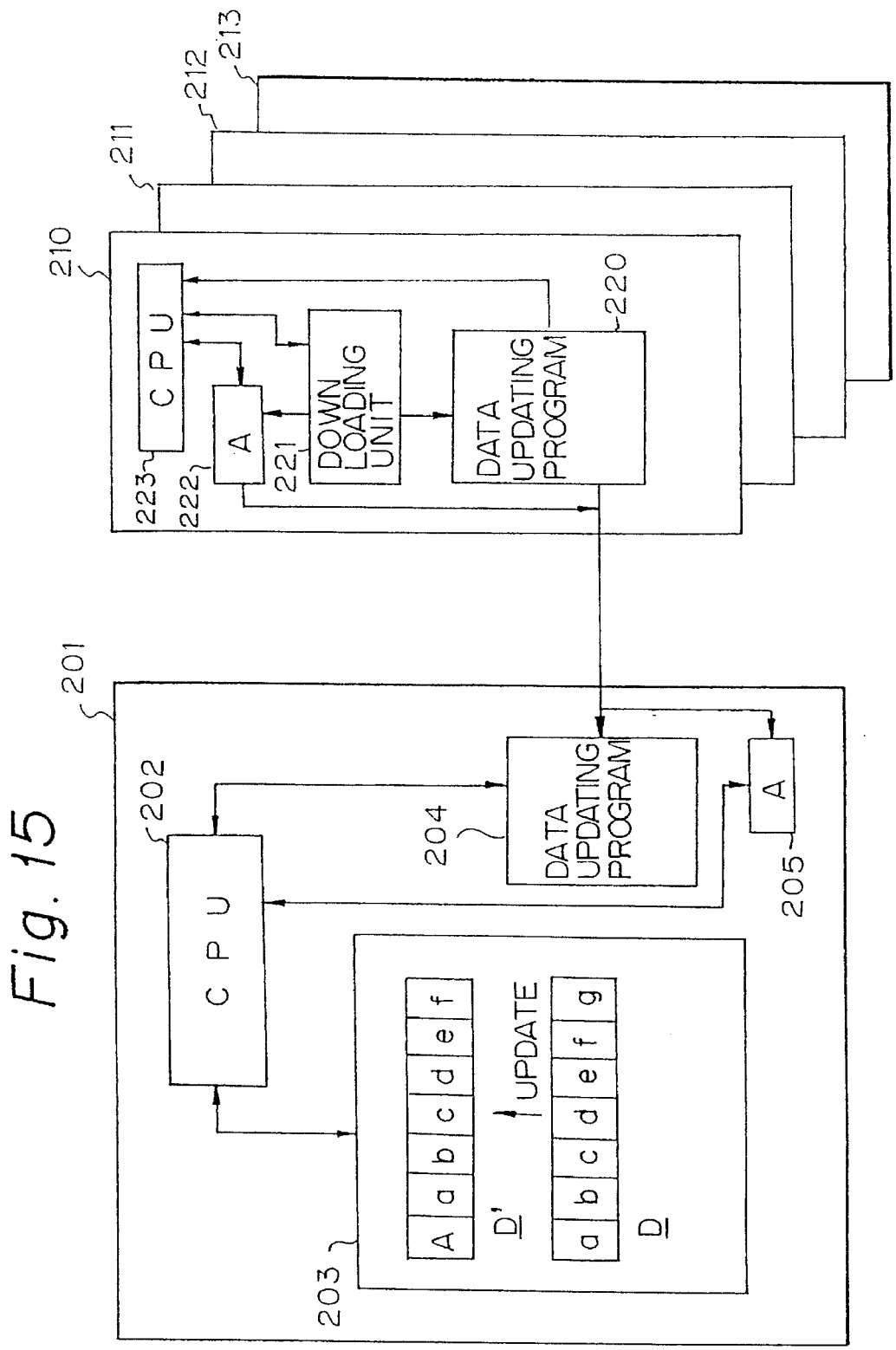
FIG. 15 is a block diagram showing practical construction of the second embodiment of the invention.
Figure 16:
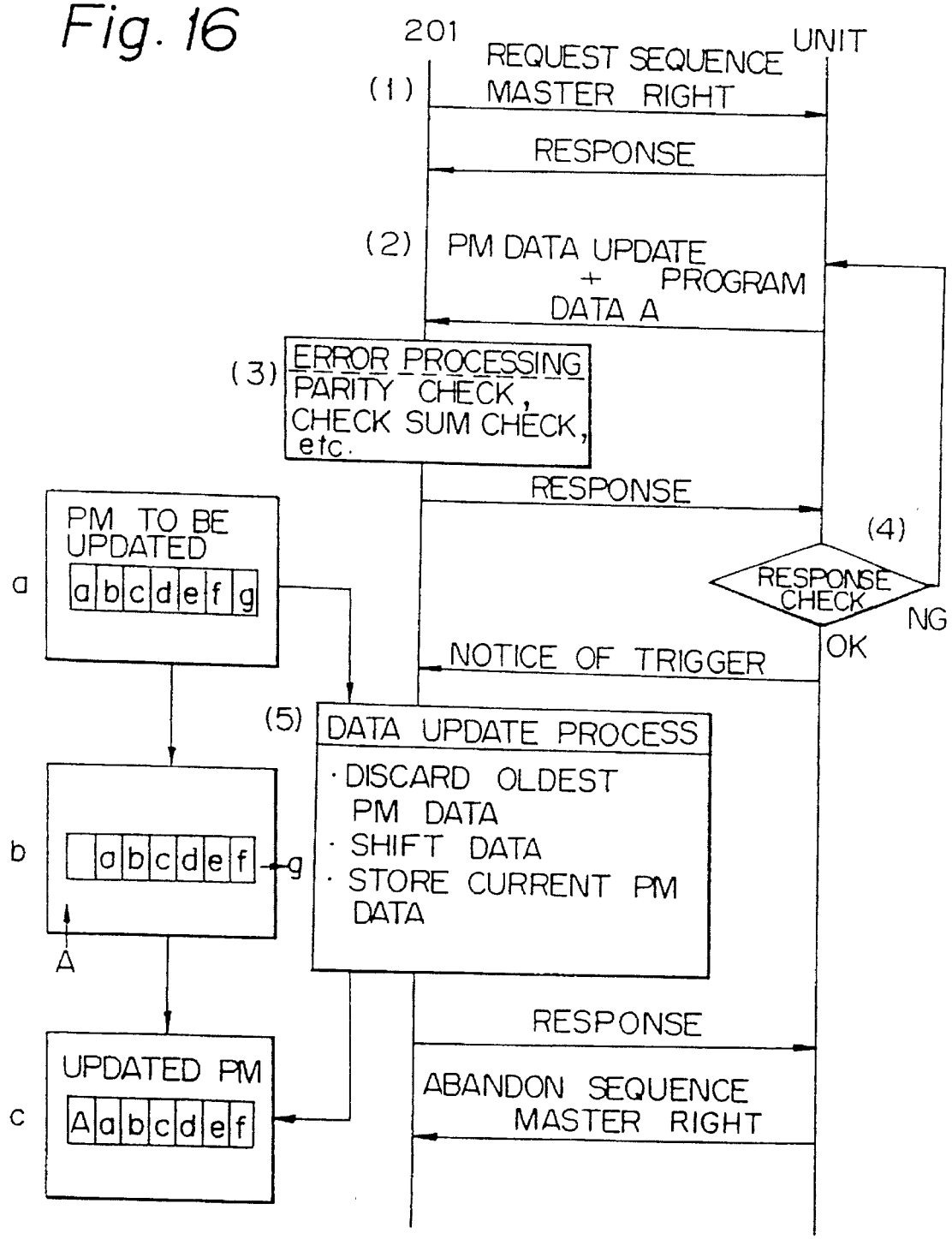
FIG. 16 is a chart showing procedure of updating data between the integrated state management device and the unit in the second embodiment.

Further detail of the second embodiment of the memory updating system for the integrated state management device will be discussed hereinafter with reference to FIGS. 15 and 16, in which FIG. 15 shows the practical construction of the second embodiment, and FIG. 16 shows practical Operation in data updating process. It should be noted that the same components to the foregoing FIG. 13 are represented by the same reference numerals.

As in the general discussion to FIG. 13, the integrated state management device 201 in this embodiment includes the program storage area (program memory) 204, a data storing unit 205 for storing or maintaining the updating data. On the other hand, the unit 210 includes a down-loading program storage unit 221 for storing programs for down loading to control down-loading of the program and so forth to the integrated state management device 201 from the program memory 220, a data storing unit 222 for storing updating data in the unit 210, and a CPU 223.

The operation of the second embodiment of the data updating system of FIG. 15 will be discussed with reference to FIG. 16.

(1) The integrated state management device 201 issues the sequence master right request for respective of units 210,211 , . . . , in order. At this time, when the unit 210 has updating data A for updating performance data (PM) for managing the channel quality, the unit 210 makes a response to the sequence master right request from the integrated state management device 210 to obtain the sequence master right.

(2) Then, the unit 210 sends the PM updating program stored in the program memory 220 and the updating data A stored in the data storing unit 222 to the integrated state management device 201. This operation is performed by the CPU 223 based on the down-loading program stored in the down-loading program storage unit 221.

(3) In the integrated state management device 201, an error processing is performed for checking whether an error, such as a transmission error and so forth, is contained in the received data, upon reception of the updating program and the updating data A. The error checking process for detecting the transmission error and so forth is performed through the checking process for normal command provided in the integrated state management device. The result of the error process is returned to the unit 210 as the response.

(4) When the response from the integrated state management device 201 indicates NG, i.e. occurrence of transmission error, the process in (2) is re-tried by the unit 210. On the other hand, when no error in transmission is detected through the error processing, the unit 210 sends a notice for initiation to the integrated state management device 201.

(5) In response to the notice for initiation, the CPU 202 in the integrated state management device 201 initiate data updating process according to the updating program stored in the program memory 204. During this process, the updating data A is maintained in the data storing unit 5.

The data updating process is performed through the following process.

(a) Initially, among a history data a to g of the PM data to be updated in the memory 203, the CPU 202 erases the oldest data g.

(b) Then, the remaining data a though f are shifted to the older area one by one.

(c) The working PM data A is stored in the area of the memory 203 as the most recent data.

(6) After completing the data updating process through the process set forth above, the integrated state management device 1 sends the response signal to the unit 210 and thus reports the result of the data updating process. The unit 210 is responsive to this to abandon the sequence master right to allow other units to use the memory of the integrated state management device 201.

It should be noted that the performance data PM is data for periodic or cyclic check of error ratio and so forth for detecting the failure condition of the lines.

Next, with reference to FIG. 17, process of check SUM calculation will be discussed.

According to the second embodiment of the present invention, when check SUM calculation is to be performed for checking whether or not the contents of the memory in the integrated state management device 201 and the contents of the memories of respective units are consistent with each other, a program for check SUM calculation processing is down-loaded from the program memory of the unit to the integrated state management device so that the check SUM calculation is performed in the integrated state management device and the result is reported to the corresponding unit.

Figure 17:
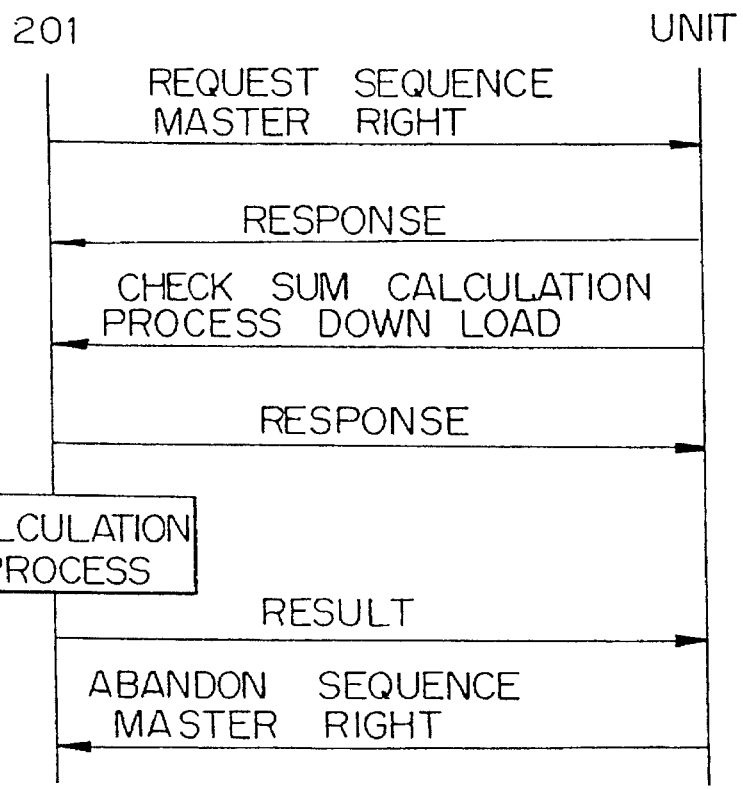

Namely, as shown in FIG. 17, the unit makes response to the sequence master right request to obtain the sequence master right. Subsequently, the unit performs down-loading of the check SUM calculation processing program to the integrated state management device.

The integrated state management device reads out the data from the memory based thereon and performs check SUM calculation process. The integrated state management device then reports the result of calculation to the corresponding unit. The unit is responsive to this report to abandon the sequence master right. Also, the unit compares the result of the check SUM calculation with the result of check SUM calculation performed therein to make judgment for the consistency of the data.

Figure 18:
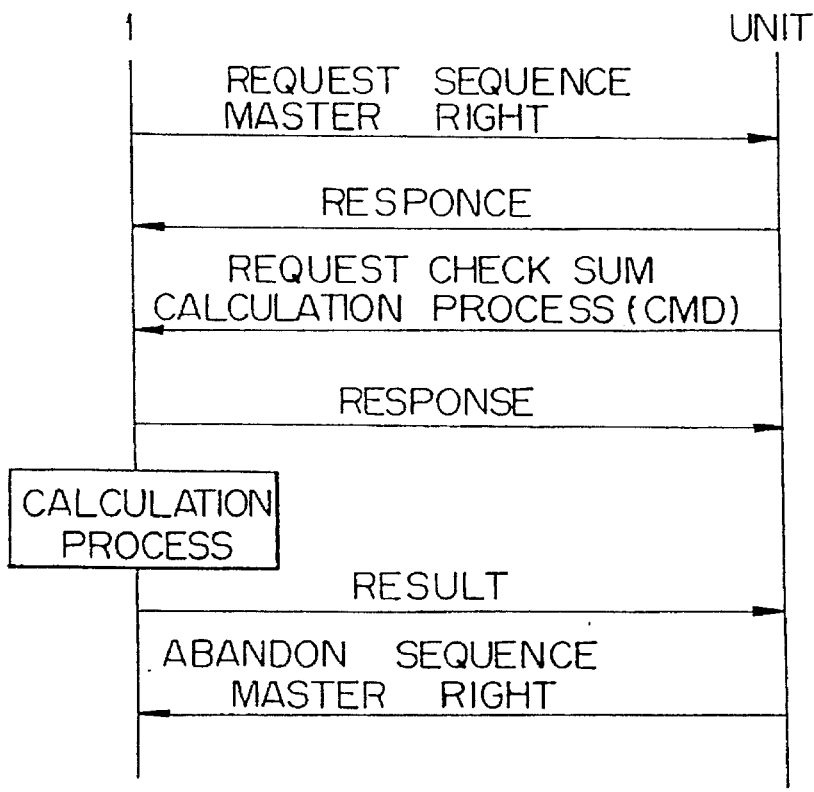

When various processes are required from the units to the integrated state management device by sending commands (CMD), the sequence is as illustrated in FIG. 18. FIG. 18 shows an example to make request for check SUM calculation by a command.

In this case, conventionally, it becomes necessary that the integrated state management device has a program for performing a process of the command requested by the units. Here, the process, such as PM data updating and so forth, may use different updating program depending upon the functions given to the unit. Therefore, in such a case, the integrated state management device is required to hold a new program when a new function is added to the units. This results in necessity of modification of the program, i.e. modification of hardware in the integrated state management device corresponding to modification of the functions in the units.

The present invention avoids such necessity by taking the way to down-load the necessary program from the unit to the integrated state management device. Therefore, according to the second embodiment of the present invention, irrespective of the function of respective unit, data processing, such as data updating process, can be performed by executing the down-loaded program. In addition, even when the unit is added, the hardware of the integrated state management device is not necessary to be modified.

On the other hand, upon performing updating of data in the integrated state management device or upon performing check SUM calculation and so forth, the process can be performed without moving data from the integrated state management device to the unit. Therefore, it will not arise the problem of increasing of the sequence or of expansion of the process time. Accordingly, even when the memory capacities in respective units are not sufficient, the sequence for transferring data is not increased and thus does not cause the problem of longer process time.

As set forth above, since the integrated state management device can be established independent of the types and management data, it make it easy to add the units or add new functions for the unit to provide higher efficiency in version up and function up.

In addition, in view of the current status of technology, in which lack of capacity of memory in each unit is frequently caused, the present invention can solve the problem of delay in the data updating period.

The above-described first embodiment and the second embodiment both solve the problem in the transmission equipment by different approaches. Namely, there was a problem when a new unit or new function is to be added in the transmission equipment. To solve the problem, the first embodiment provides the units as pure hardware and dual system CPU boards; and by contrast, the second embodiment does not largely change the transmission equipment but merely providing a program down-loading means in each unit.

While the present invention has been discussed in terms of the preferred embodiments of the invention, there are various modifications, changes, additions, omissions of detail of the embodiments in implementing the present invention. Therefore, it should be noted that the present invention includes all possible implementations without departing principle of the invention as set out in the appended claims.

What is claimed is:

1. A transmission equipment comprising:
    a plurality of units for performing respectively predetermined functions, each of said units having a respective data updating program storing section for storing a data updating program, and having down-loading means for down-loading the data updating program stored in the data updating program storing section;
    a center management device connected to said units for collecting data from respective units, said center management device including:
    a down-loaded program storing section for storing said respective data updating program when down-loaded by said down-loading means of each of the units, and for carrying out updating of data in a memory in said center management device, which data in said memory indicates a status of the respective unit in accordance with said data updating program in the down-loaded program storing section;
    first processing means for performing predetermined processing operations including at least one specific operation which requires interruption of services;
    second processing means for performing predetermined processing operations including at least one specific operation which requires interruption of services; and
    third means for controlling operational states of said first and second processing means between a first state active for services and a second state inactive for services, said third means being responsive to initiation of said specific operation of the processing means acting in said first state to switch status thereof into said second state and to switch the other of said first and second processing means into said first state for services.

2. A transmission equipment as set forth in claim 1, wherein said specific operation is data back-up operation.

3. A transmission equipment as set forth in claim 1, wherein said specific operation is program loading operation.

4. A transmission equipment as set forth in claim 1, further comprising a data back-up means for backing up data in said first and second processing means, wherein said data. back-up means includes a non-volatile memory for backing up said data.

5. A transmission equipment as set forth in claim 4, wherein said specific operation is data back-up of said units for writing data in a respective unit to said non-volatile memory through one of said first and second processing means in said second state.

6. A transmission equipment as set forth in claim 1, wherein said first and second processing means normally operates in unison with each other irrespective of operational status so as to allow instant change over of states for maintaining services.

7. A transmission equipment as in claim 1, wherein said specific operation is a diagnosis operation.

8. A transmission equipment comprising:
    a CPU processing unit for collecting data from a plurality of units that perform respectively predetermined functions and for processing data of said units;
    said CPU processing unit including:
    a first CPU board;
    a second CPU board active as one of a standby board and a working board relative to said first CPU board;
    a controller, operatively connected to said first CPU board and to said second CPU board;
    a program loader for down-loading a predetermined program for operation of said boards into said first CPU board and into said second CPU board, in response to a controlling signal generated from said controller;

CPU board switching means, connected to said controller, for switching said first CPU board and said second CPU board between a working state and a standby state under control of said controller;

data back-up means including a non-volatile memory for backing up data in said first and second CPU boards, said controller requesting said CPU board switching means to switch said first and second CPU boards between working and standby in accordance with a request from one of said first CPU board, said second CPU board and said units, and further requesting said program loader to down-load a program corresponding to said request into one of said first CPU board and said second CPU board.

9. A transmission equipment comprising:

a plurality of units performing respectively predetermined functions;

a center management device monitoring states of respective units, said center management device including a memory for storing data received from said respective units which data represents a status of respective units;

each unit including means for down-loading to said center management device a data updating program to be executed for updating said data at said center management device which data represents the status of the unit;

said center management device comprising a first and a second processing means, each of which includes at least two sub-processing means for processing data generated by each one of said units and a switching unit, said two sub-processing means being controlled by a respective switching unit provided in each of said processing means, when one of said sub-processing means is operated, the other sub-processing means is in a standby condition; a self-diagnosis means; at least one data-holding means commonly connected to said two sub-processing means for holding data processed in said respective sub-processing means, and at least two program-holding means each connected to one of said sub-processing means, respectively, for holding a program to operate the respective sub-processing means, said self-diagnosis means being coupled to said first and second processing means for causing one of said first and second processing means which is in a standby condition to perform a self-diagnosis operation for at least one of said plurality of units which is in a standby condition.

10. A transmission equipment as set forth in claim 9, wherein said center management device includes a program memory for storing said down-loaded data updating program.

11. A transmission equipment as set forth in claim 9, wherein said center management device assigns a right for updating data to one of said units which has data to be updated, said device also receiving from said unit said data to be updated and said data updating program, for performing an updating operation and for storing the updated data which represents the status of the corresponding unit, in a memory thereof.

12. A transmission equipment as set forth in claim 9, wherein said center management device includes:

first processing means for performing predetermined processing operations including program down-loading operation which requires interruption of services;

second processing means for performing predetermined processing operations including program down-loading operation which requires interruption of services; and third means for controlling operational states of said first and second processing means between a first state active for services and a second state inactive for services, said third means being responsive to initiation of said program down-loading operation of the processing means acting in said first state to switch status thereof into said second state and switch the other of said first and second processing means into said first state for services.

13. A transmission equipment as set forth in claim 9, wherein said center management device comprises:

a first CPU board;

a second CPU board active as one of a standby board and a working board relative to said first CPU board;

a controller, operatively connected to said first CPU board and to said second CPU board;

a program loader, for down-loading a predetermined program for operation of said boards to said first CPU board and said second CPU board;

CPU board switching means, connected to said controller, for switching said first CPU board and said second CPU board between a working state and a standby state under control of said controller; and data back-up means including a non-volatile memory for backing up data in said first and second CPU boards.

14. A transmission equipment as set forth in claim 13, wherein said first CPU board and said second CPU board are respectively provided with working and reverse CPUs.

15. A memory updating system in combination with a center management device in a transmission equipment comprising:

a plurality of units of different type having different functions;

a memory incorporated in said center management device for storing a plurality of different types of data which represent a respective status of said units;

program holding means provided in each of said units for storing an updating program for performing an updating operation for said data in said memory which data represents the status of the corresponding unit;

down-loading means provided in each of said units for down-loading said updating program from said unit to said center management device;

execution means provided in said center management device for executing said down-loaded updating program for updating said memory with data which represents the status of the unit from which said updating program is down-loaded.

16. A transmission equipment comprising:

a plurality of units of different type having different functions;

a center management device connected to said units;

a memory incorporated in said center management device for storing a plurality of different types of data which represent a respective status of said units;

program holding means provided in each of said units for storing a program for performing a function corresponding to a command provided in the corresponding unit;

down-loading means provided in each of said units for down-loading said program from said unit to said center management device;

execution means provided in said center management device for executing said down-loaded program for performing a corresponding command functions.

17. A transmission equipment comprising:

a plurality of units each of which perform predetermined functions, respectively, each of said units having a respective data updating program storing section for storing a data updating program, and having downloading means for downloading the data updating program stored in the data updating program storing section; and a center management device connected to said units for collecting data from each one of said units, a down-loaded program storing section for storing said respective data updating program when downloaded by said downloading means of each of the units, and for carrying out updating of data in a memory in said center management device, which data in said memory indicates a status of the respective unit in accordance with said data updating program in the downloaded program storing section;

said center management device including:

a first processing means for performing predetermined processing operations, including at least one specific operation which requires an interruption of services to said unit;

a second processing means for performing predetermined processing operations, including at least one specific operation which requires interruption of services to said unit;

a third means for controlling operation states of said first and second processing means between a first state active for services and a second state inactive for services, said third means being responsive to initiation of said specific operation, to switch one of said first and second processing means acting in said first state to said second state, and simultaneously to switch another one of said first and second processing means acting in said second state to said first state;

a program loading means including said down-loaded program storing section connected to said third means and to both of said first and second processing means; and a data back-up means connected to said first and second processing means, each one of said first and second processing means including:

at least two sub-processing means for processing data generated by each of said units, and a switching unit, said two sub-processing means being controlled by a respective switching unit provided in each of said processing means, so that when one of said sub-processing means is operated, the other sub-processing means is in a standby condition, at least one data-holding means commonly connected to said two sub-processing means, and at least two program-holding means each being connected to one of said sub-processing means, respectively, further connected to each other, and commonly connected to said program loading means;

said center management device further comprising self-diagnosis means coupled to said program loading means, for causing one of said first and second processing means which is in a standby condition to perform a self-diagnosis operation for at least one of said plurality of units which is in a standby condition.

* * * * *